US012365179B2

(12) United States Patent
Watanabe et al.

(10) Patent No.: US 12,365,179 B2
(45) Date of Patent: Jul. 22, 2025

(54) LIQUID DISCHARGE APPARATUS, AND METHOD OF CONTROLLING THE SAME

(71) Applicant: SEIKO EPSON CORPORATION, Tokyo (JP)

(72) Inventors: Yuki Watanabe, Matsumoto (JP); Akira Miyagishi, Shiojiri (JP); Madoka Ito, Shiojiri (JP); Akinori Taniuchi, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 254 days.

(21) Appl. No.: 18/160,655

(22) Filed: Jan. 27, 2023

(65) Prior Publication Data

US 2023/0241887 A1 Aug. 3, 2023

(30) Foreign Application Priority Data

Jan. 28, 2022 (JP) ................................ 2022-011782

(51) Int. Cl.
*B41J 2/045* (2006.01)

(52) U.S. Cl.
CPC ....... *B41J 2/04588* (2013.01); *B41J 2/04581* (2013.01)

(58) Field of Classification Search
CPC . B41J 2/025; B41J 2/03; B41J 2/04541; B41J 2/04581; B41J 2/04588; B41J 2/04593
See application file for complete search history.

(56) References Cited

U.S. PATENT DOCUMENTS

| | | | | |
|---|---|---|---|---|
| 7,475,960 B2 * | 1/2009 | Oku | ..................... | B41J 2/16579 347/68 |
| 2013/0307896 A1 * | 11/2013 | Shinkawa | ............ | B41J 2/16579 347/19 |
| 2015/0070420 A1 * | 3/2015 | Shinkawa | .............. | B41J 2/0451 347/9 |
| 2016/0279929 A1 * | 9/2016 | Shinkawa | .............. | B41J 2/2142 |

FOREIGN PATENT DOCUMENTS

| | | |
|---|---|---|
| JP | 2016-159573 A | 9/2016 |
| JP | 2019-064112 A | 4/2019 |
| JP | 2021-169190 A | 10/2021 |

* cited by examiner

*Primary Examiner* — Anh T Vo
(74) *Attorney, Agent, or Firm* — WORKMAN NYDEGGER

(57) ABSTRACT

A liquid discharge apparatus includes: a plurality of dischargers including a nozzle, a pressure chamber, and a drive element to discharge liquid in the pressure chamber through the nozzle; and a driver that generates, for each of the plurality of dischargers, an individual drive signal to drive the drive element based on a plurality of drive signals including a first drive signal having a first contraction waveform in which an electrical potential changes to cause a volume of the pressure chamber to contract, and a second drive signal having a second contraction waveform in which an electrical potential changes to cause the volume of the pressure chamber to contract. In one cycle, a center of one of a time period of the first contraction waveform and a time period of the second contraction waveform is located in the other of the time periods.

10 Claims, 12 Drawing Sheets

FIG. 10

| TIMING DIFFERENCE | −25% | −20% | −15% | −10% | −5% | 0% | +5% | +10% | +15% | +20% | +25% |
|---|---|---|---|---|---|---|---|---|---|---|---|
| LANDING POSITION DIFFERENCE | △ | △ | ○ | ○ | ◎ | ◎ | ◎ | ○ | ○ | △ | △ |

◎: GOOD

○: ACCEPTABLE

△: OUT OF ACCEPTABLE RANGE

LIQUID DISCHARGE APPARATUS, AND METHOD OF CONTROLLING THE SAME

The present application is based on, and claims priority from JP Application Serial Number 2022-011782, filed Jan. 28, 2022, the disclosure of which is hereby incorporated by reference herein in its entirety.

BACKGROUND

1. Technical Field

The present disclosure relates to a liquid discharge apparatus, and a method of controlling the liquid discharge apparatus.

2. Related Art

JP-A-2019-64112 discloses a liquid discharge apparatus that prints an image by discharging liquid such as ink through a plurality of nozzles using piezoelectric elements. For example, a drive signal having a drive waveform corresponding to image data is supplied to one of electrodes of a piezoelectric element, and a bias voltage signal with a constant voltage is supplied to the other of electrodes of the piezoelectric element. A drive signal is generated, for example, by selecting a common drive signal according to image data from a plurality of common drive signals which cause droplets with different amounts to be discharged through nozzles. For example, one common drive signal among a plurality of common drive signals has a drive waveform which causes the amount of droplets associated with the one common drive signal to be discharged through nozzles.

Meanwhile, when the amount of current flowing through a line which receives a common drive signal changes according to the drive waveform of a common drive signal, the electrical potential of a bias voltage signal supplied to a piezoelectric element may fluctuate. When the electrical potential of a bias voltage signal fluctuates, characteristics of discharge of droplets may be changed, and the landing position of droplets may deviate from a predetermined position. When the landing position of droplets deviates from a predetermined position, the quality of printed image is reduced. Therefore, it is desired to prevent a change in the characteristics of discharge of droplets in the liquid discharge apparatus.

SUMMARY

In order to solve the above-mentioned problem, a liquid discharge apparatus according to the present disclosure includes: a plurality of dischargers including a nozzle to discharge liquid, a pressure chamber communicating with the nozzle, and a drive element to discharge liquid in the pressure chamber through the nozzle; and a driver that generates, for each of the plurality of dischargers, an individual drive signal to drive the drive element included in the discharger based on a plurality of drive signals including a first drive signal having a first waveform, and a second drive signal having a second waveform different from the first waveform. The first waveform includes a first contraction waveform in which an electrical potential of the first drive signal changes to cause a volume of the pressure chamber to contract, and the second waveform includes a second contraction waveform in which an electrical potential of the second drive signal changes to cause the volume of the pressure chamber to contract, and in one cycle of the plurality of drive signals, a center of one of a time period of the first contraction waveform of the first drive signal and a time period of the second contraction waveform of the second drive signal is located in the other of the time periods.

In addition, a method of controlling a liquid discharge apparatus according to the present disclosure provides a method of controlling a liquid discharge apparatus including a plurality of dischargers including a nozzle to discharge liquid, a pressure chamber communicating with the nozzle, and a drive element to discharge liquid in the pressure chamber through the nozzle, the method comprising generating, for each of the plurality of dischargers, an individual drive signal to drive the drive element included in the discharger based on a plurality of drive signals including a first drive signal having a first waveform, and a second drive signal having a second waveform different from the first waveform. The first waveform includes a first contraction waveform in which an electrical potential of the first drive signal changes to cause a volume of the pressure chamber to contract, and the second waveform includes a second contraction waveform in which an electrical potential of the second drive signal changes to cause the volume of the pressure chamber to contract, and in one cycle of the plurality of drive signals, a center of one of a time period of the first contraction waveform of the first drive signal and a time period of the second contraction waveform of the second drive signal is located in the other of the time periods.

BRIEF DESCRIPTION OF THE DRAWINGS

FIG. 10 is an explanatory chart for explaining an experimental result when a timing relationship between drive signals with large dots and small dots is changed.

DESCRIPTION OF EXEMPLARY EMBODIMENTS

Figure 1:
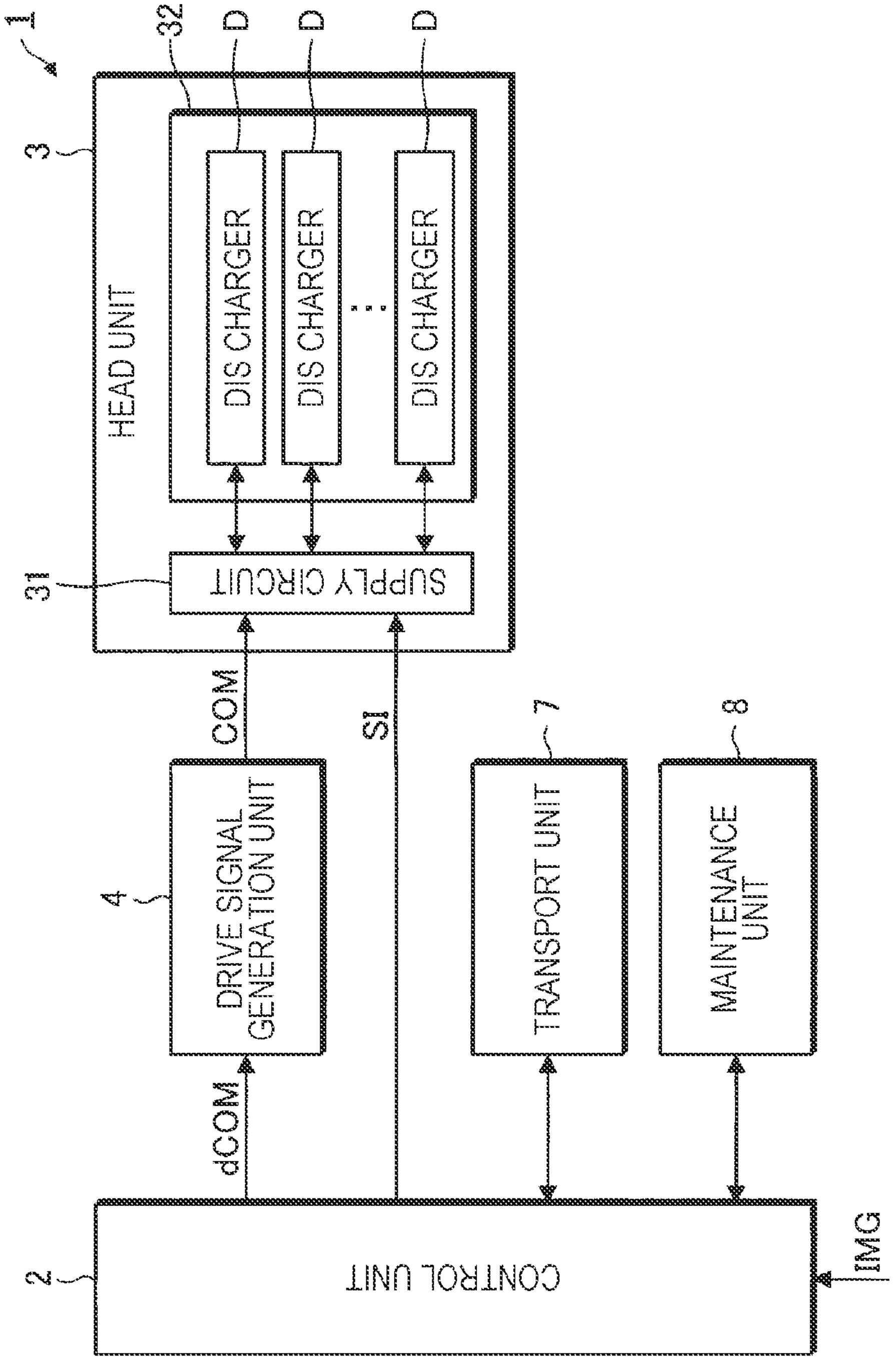
FIG. 1 is a block diagram illustrating an example of the configuration of an ink jet printer according to an embodiment of the present disclosure.

Hereinafter an embodiment for implementing the present disclosure will be described with reference to the drawings.

However, in the drawings, the dimensions and scale of components are different from the actual ones as appropriate. Also, since the embodiments described below are preferred specific examples of the present disclosure, technically preferred various limitations are imposed. However, the scope of the present disclosure is not limited to these embodiments unless otherwise stated in the following description.

1. Embodiment

In this embodiment, a liquid discharge apparatus will be described by exemplifying an ink jet printer that forms an image by discharging ink to a recording sheet. Note that in this embodiment, ink is an example of "liquid". First, referring to FIG. 1, the configuration of a drive signal generation unit 4 according to this embodiment will be described.

FIG. 1 is a block diagram illustrating an example of the configuration of an ink jet printer 1 according to the embodiment of the present disclosure.

Figure 2:
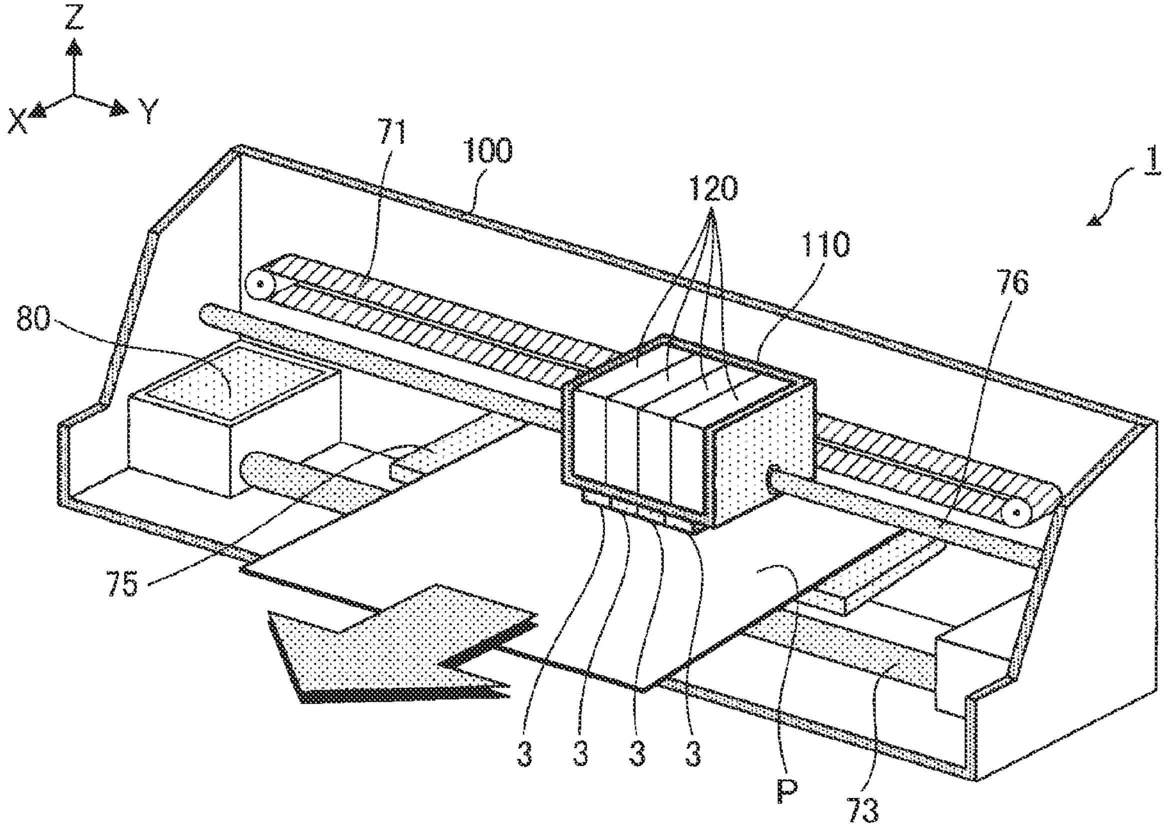
FIG. 2 is a perspective view illustrating an example of a schematic internal structure of the ink jet printer.

From a host computer such as a personal computer or a digital camera, print data IMG indicating an image to be formed by the ink jet printer 1 is supplied to the ink jet printer 1. The ink jet printer 1 executes a print process of forming, on a medium, an image indicated by the print data IMG supplied from the host computer. In this embodiment, the later-described recording sheet P illustrated in FIG. 2 is assumed as the medium.

The ink jet printer 1 has: a control unit 2 that controls the components of the ink jet printer 1; a head unit 3 provided with dischargers D that discharge ink; and a drive signal generation unit 4 that generates a plurality of drive signals COM to drive the dischargers D. In addition, the ink jet printer 1 has a transport unit 7 to change the relative position of the recording sheet P with respect to the head unit 3; and a maintenance unit 8 that executes a maintenance process of maintaining the dischargers D provided in the head unit 3.

Note that in this embodiment, it is assumed that the head unit 3 and the drive signal generation unit 4 correspond to each other. For example, the ink jet printer 1 may have a plurality of head units 3, and a plurality of drive signal generation units 4 in one-to-one correspondence with the plurality of head units 3. Alternatively, the ink jet printer 1 may have one head unit 3, and one drive signal generation unit 4 corresponding to the one head unit 3. In this embodiment, it is assumed that the ink jet printer 1 has four head units 3, and four drive signal generation units 4 in one-to-one correspondence with the four head units 3. However, in the following, for the convenience of description, as illustrated in FIG. 1, a description may be given with a focus on one head unit 3 among the four head units 3, and one drive signal generation unit 4 which is among the four drive signal generation units 4 and provided in correspondence with the one head unit 3.

The control unit 2 is configured to include one or a plurality of central processing units (CPU). Note that the control unit 2 may be configured to include a programable logic device such as a field-programmable gate array (FPGA) in substitution for CPUs or in addition to CPUs. Alternatively, the control unit 2 is configured to include one or both of a volatile memory such as a random access memory (RAM), and a non-volatile memory such as a read only memory (ROM), an electrically erasable programmable read-only memory (EEPROM), or a programmable ROM (PROM).

Figure 6:
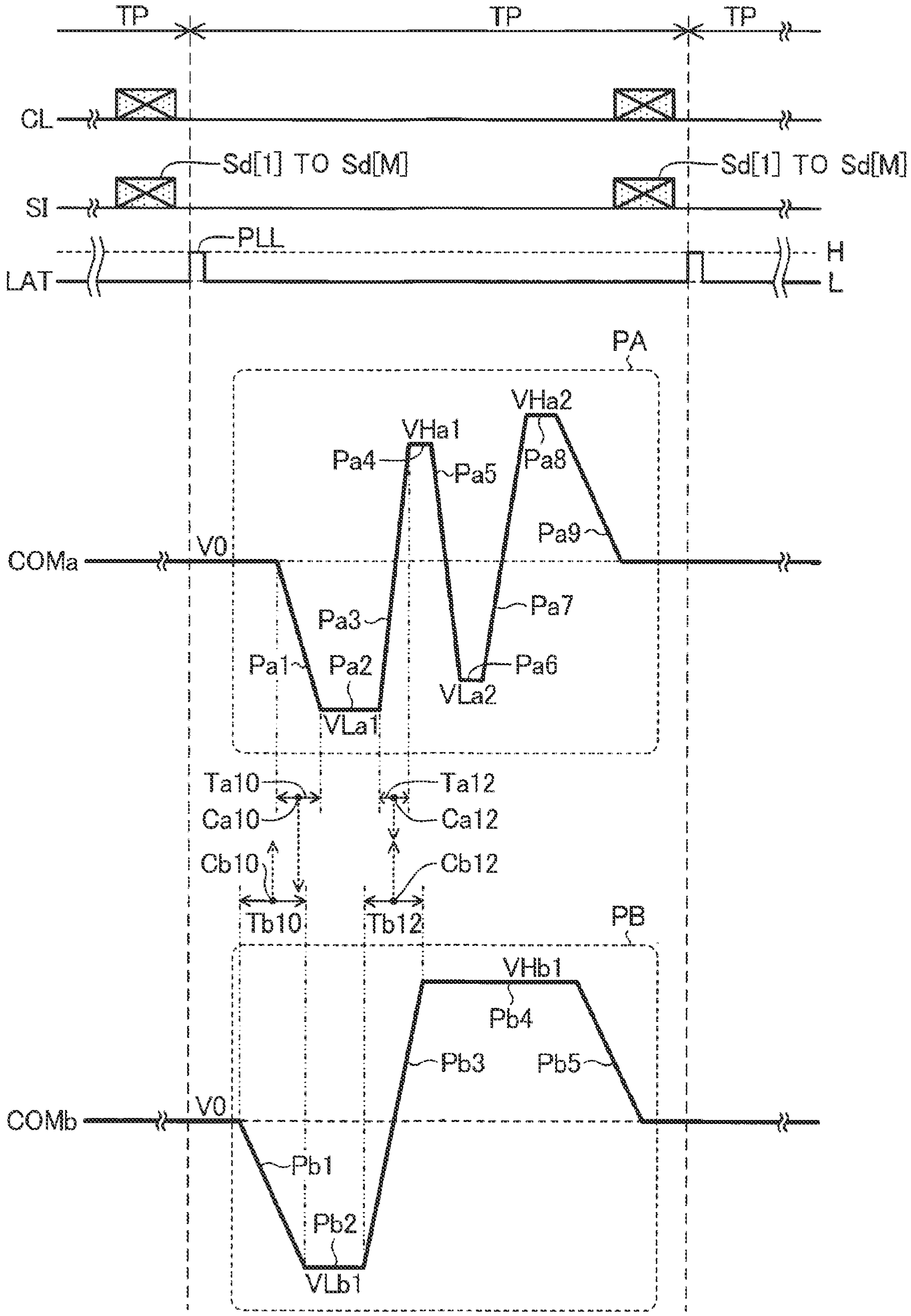
FIG. 6 is a timing chart for explaining an example of signals supplied to the head unit.

Although the details will be described later, the control unit 2 generates signals, such as a print signal SI and a waveform specification signal dCOM, to control the operation of the components of the ink jet printer 1. Here, the waveform specification signal dCOM is a digital signal that defines the waveform of each of a plurality of drive signals COM. Also, each drive signal COM is an analog signal to drive a discharger D. In this embodiment, as illustrated in FIG. 6 and other figures described later, it is assumed that a plurality of drive signals COM include a drive signal COMa and a drive signal COMb. The print signal SI is a digital signal to specify the type of operation of the discharger D. Specifically, the print signal SI is a digital signal to specify the type of operation of the discharger D by specifying whether a drive signal COM is supplied to the discharger D.

The drive signal generation unit 4 includes, for example, a digital analog converter (DAC), and generates a plurality of drive signals COM based on the waveform specification signal dCOM supplied from the control unit 2. For example, each of the plurality of drive signals COM generated by the drive signal generation unit 4 includes a waveform defined by the waveform specification signal dCOM. The drive signal generation unit 4 outputs the plurality of drive signals COM generated based on waveform specification signals dCOM to a supply circuit 31 included in the head unit 3.

The head unit 3 has the supply circuit 31 and a recording head 32. The supply circuit 31 is an example of a "driver".

The recording head 32 has M dischargers D. Note that value M is a natural number of one or more. In the following, the mth discharger D among the M dischargers D provided in the recording head 32 may be denoted by the discharger D[m], where variable m is a natural number and "$1 \le m \le M$". Also, in the following, when a component or a signal of the ink jet printer 1 corresponds to the discharger D[m] among the M dischargers D, a symbol to represent the component or the signal may be labeled with a subscript [m].

Figure 5:
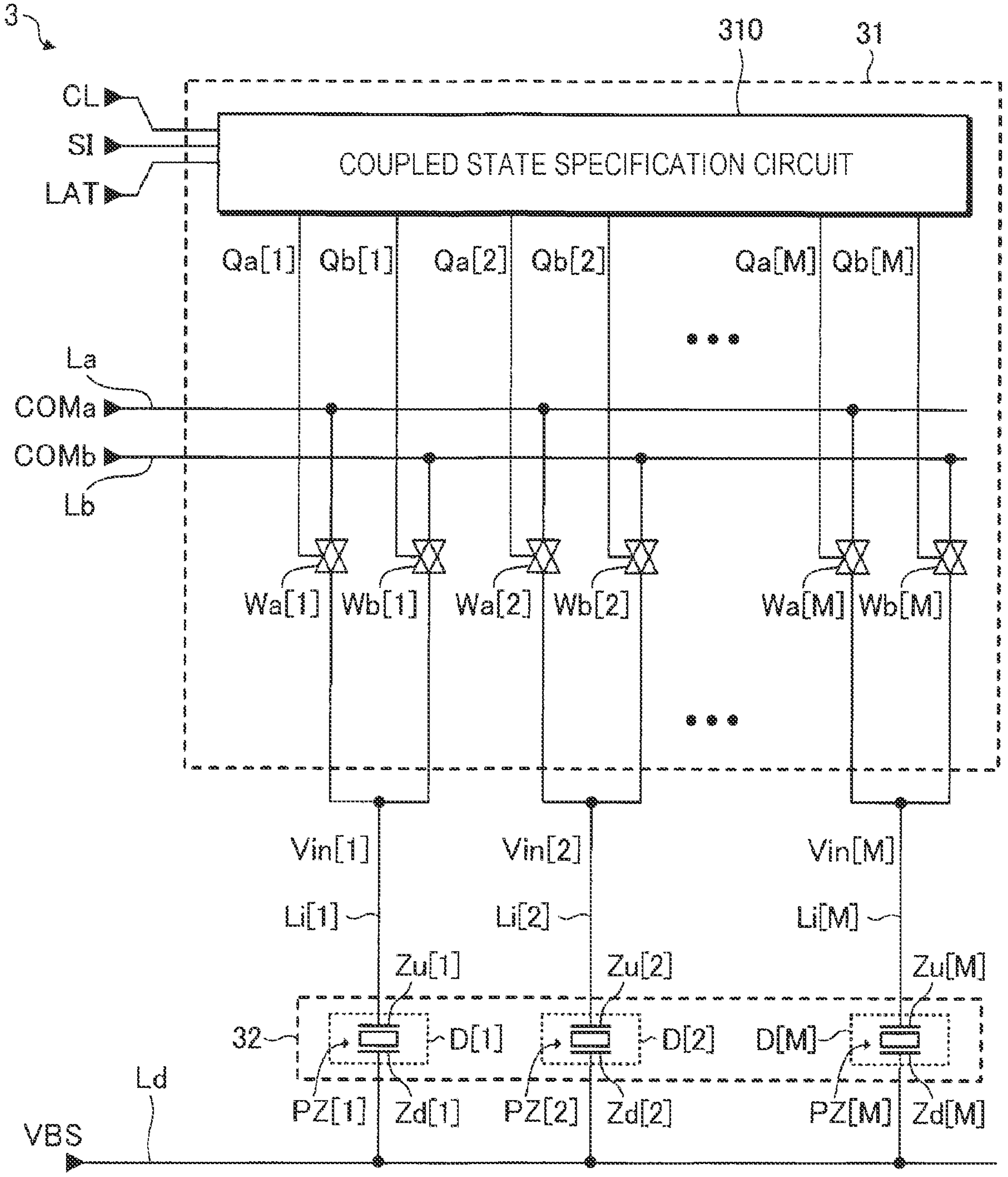
FIG. 5 is a block diagram illustrating an example of the configuration of a head unit.

The supply circuit 31 switches whether each drive signal COM is to be supplied to the discharger D[m] based on the print signal SI. Note that in the following, as illustrated in FIG. 5 described later, a drive signal COM supplied to the discharger D[m] among the plurality of drive signals COM may be denoted by an individual drive signal Vin[m].

As described above, the ink jet printer 1 executes a print process in this embodiment. When a print process is executed, the control unit 2 generates a signal, such as a print signal SI, to control the head unit 3, based on the print data IMG. In addition, when the print process is executed, the control unit 2 generates a signal, such as a waveform specification signal dCOM, to control the drive signal generation unit 4. In addition, when the print process is executed, the control unit 2 generates a signal to control the transport unit 7. Thus, in the print process, the control unit 2 adjusts the presence or absence of ink discharge from the discharger D[m], an ink discharge amount, and an ink discharge timing, while controlling the transport unit 7 to change the relative position of the recording sheet P with respect to the head unit 3. In this manner, the control unit 2 controls the components of the ink jet printer 1 so that an image corresponding to the print data IMG is formed on the recording sheet P.

In addition, as described above, in this embodiment, the ink jet printer 1 executes the maintenance process. For example, the maintenance process includes a flushing process of draining the ink from the dischargers D, a wiping process of wiping off foreign materials, such as ink, adhering to the vicinity of nozzles N of the dischargers D by a wiper, and a pumping process of sucking out the ink in the dischargers D by a tube pump or the like. The nozzles N will be described later in FIG. 3.

The maintenance unit 8 has a discharge ink receiver 80 to receive drained ink when the ink in the discharger D is drained in a flushing process, a wiper to wipe off foreign materials, such as ink, adhering to the vicinity of the nozzles N of the dischargers D, and a tube pump to suck out the ink and air bubbles in the dischargers D. The discharge ink receiver 80 will be described later in FIG. 2. Illustration of the wiper and the tube pump is omitted. Next, referring to FIG. 2, the schematic internal structure of the ink jet printer 1 will be described.

FIG. 2 is a perspective view illustrating an example of the schematic internal structure of the ink jet printer 1.

As illustrated in FIG. 2, it is assumed that the ink jet printer 1 is a serial printer in this embodiment. Specifically, when a print process is executed, the ink jet printer 1 forms dots according to print data IMG on the recording sheet P by discharging ink from the dischargers D[m] and reciprocating the head unit 3 in a main scan direction crossing a sub-scan direction, while transporting the recording sheet P in the sub-scan direction.

In the following, for the convenience of description, a Cartesian coordinate system having three axes, X-axis, Y-axis and Z-axis orthogonal to each other is introduced as needed. In the following, the direction indicated by an arrow on the X-axis is referred to as +X direction, and the direction opposite to +X direction is referred to as −X direction. The direction indicated by an arrow on the Y-axis is referred to as +Y direction, and the direction opposite to +Y direction is referred to as −Y direction. In addition, the direction indicated by an arrow on the Z-axis is referred to as +Z direction, and the direction opposite to +Z direction is referred to as −Z direction. Also, in the following, +X direction and −X direction may be referred to as the X direction without particularly distinguishing therebetween, and +Y direction and −Y direction may be referred to as the Y direction without particularly distinguishing therebetween. Also, +Z direction and −Z direction may be referred to as the Z direction without particularly distinguishing therebetween. In this embodiment, +X direction is set as the sub-scan direction, and +Y direction and −Y direction are set as the main scan direction. In this embodiment, as illustrated in FIG. 2, −Z direction is set as the direction of ink discharge from the discharger D[m].

The ink jet printer 1 according to this embodiment has a housing 100, and a carriage 110 which can reciprocate in the Y direction within the housing 100 and on which four head units 3 are mounted.

In this embodiment, it is assumed that the carriage 110 stores four ink cartridges 120 in one-to-one correspondence with ink in four colors: cyan, magenta, yellow, and black. In this embodiment, as described above, it is assumed that the ink jet printer 1 has four head units 3 in one-to-one correspondence with the four ink cartridges 120. Each discharger D[m] receives supply of ink from an ink cartridge 120 corresponding to the head unit 3 provided with the discharger D[m]. Thus, each discharger D[m] is internally filled with the supplied ink, and can discharge the filled ink through a nozzle N. Note that the ink cartridges 120 may be provided outside the carriage 110.

As described in FIG. 1, the ink jet printer 1 according to this embodiment has the transport unit 7. The transport unit 7 has a carriage transport mechanism 71 to reciprocate the carriage 110 in the Y direction, and a carriage guide shaft 76 to support the carriage 110 freely back and forth in the Y direction. In addition, the transport unit 7 has a medium transport mechanism 73 to transport the recording sheet P, and a platen 75 provided in −Z direction with respect to the carriage 110. For example, in the print process, the carriage transport mechanism 71 reciprocates the head units 3 with the carriage 110 in the Y-direction along the carriage guide shaft 76, and the medium transport mechanism 73 transports the recording sheet P on the platen 75 in +X direction. Therefore, in the print process, the transport unit 7 changes the relative position of the recording sheet P with respect to the head units 3 by causing the carriage transport mechanism 71 and the medium transport mechanism 73 to execute the above-described operation, and enables landing of ink onto the entire recording sheet P.

Next, referring to FIG. 3, the schematic structure of the recording head 32 will be described.

Figure 3:
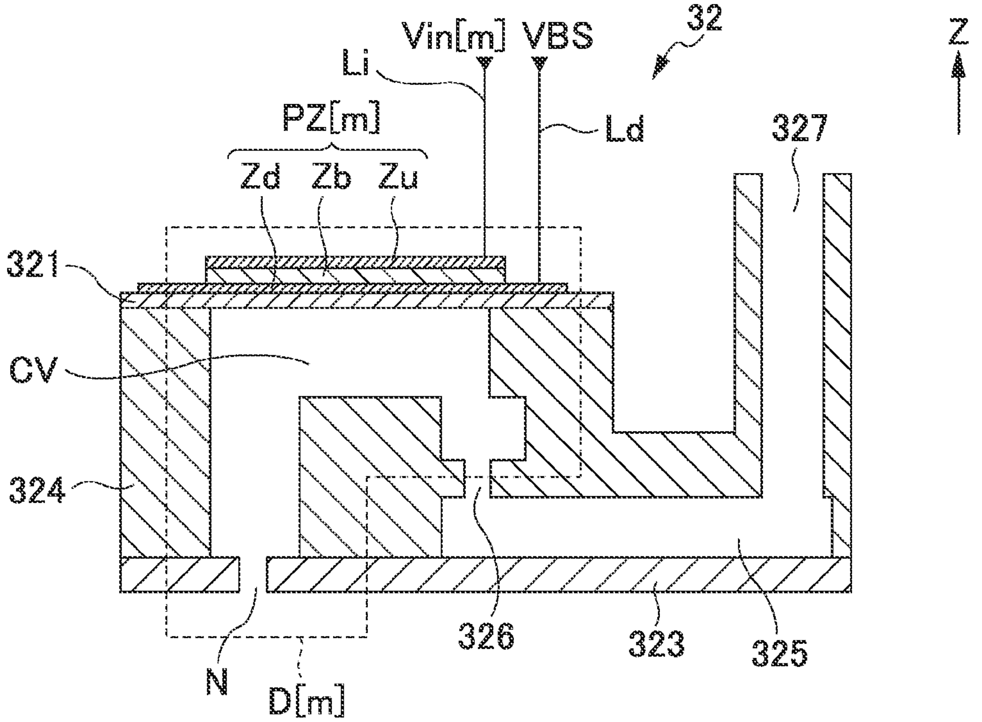
FIG. 3 is a cross-sectional view for explaining an example of the structure of a discharger.

FIG. 3 is a cross-sectional view for explaining an example of the structure of the discharger D. In FIG. 3, a cross section of part of the recording head 32 when the recording head 32 is cut to include the discharger D[m] is schematically illustrated.

The discharger D[m] has a piezoelectric element PZ[m], a cavity CV filled with ink internally, a nozzle N communicating with the cavity CV, and a vibration plate 321. The discharger D[m] causes the ink in the cavity CV to be discharged through the nozzle N by the piezoelectric element PZ[m] being driven by an individual drive signal Vin[m]. Note that the cavity CV is an example of a "pressure chamber", and the piezoelectric element PZ is an example of a "drive element".

The cavity CV is the space partitioned by a cavity plate 324, a nozzle plate 323 in which the nozzle N is formed, and the vibration plate 321. The cavity CV communicates with a reservoir 325 through an ink supply port 326. The reservoir 325 communicates with an ink cartridge 120 corresponding to the discharger D[m] through an ink intake 327. The piezoelectric element PZ[m] has an upper electrode Zu[m], a lower electrode Zd[m], and a piezoelectric body Zb[m] provided between the upper electrode Zu[m] and the lower electrode Zd[m]. The upper electrode Zu[m] is electrically coupled to a line Li to which an individual drive signal Vin[m] is supplied. The lower electrode Zd[m] is electrically coupled to a line Ld to which a bias voltage signal VBS is supplied. An individual drive signal Vin[m] is supplied to the upper electrode Zu[m], thereby causing a voltage to be applied across the upper electrode Zu[m] and the lower electrode Zd[m]. The piezoelectric element PZ[m] is displaced in +Z direction or −Z direction according to the voltage applied across the upper electrode Zu[m] and the lower electrode Zd[m]. Note that the lower electrode Zd is an example of a "bias electrode".

In this manner, the piezoelectric element PZ[m] vibrates according to the voltage applied across the upper electrode Zu[m] and the lower electrode Zd[m]. The vibration plate 321 is coupled to the lower electrode Zd[m]. Therefore, the vibration plate 321 also vibrates as the piezoelectric element PZ[m] is driven to vibrate by the individual drive signal Vin[m]. The volume of the cavity CV and the pressure in the cavity CV are changed due to the vibration of the vibration plate 321, and the ink filled in the cavity CV is discharged through the nozzle N.

In this embodiment, as an example, it is assumed that the piezoelectric element PZ is displaced in −Z direction when the electrical potential of the individual drive signal Vin[m] supplied to the discharger D[m] is changed from a low electrical potential to a high electrical potential. In other words, in this embodiment, it is assumed that when the electrical potential of the individual drive signal Vin[m] supplied to the discharger D[m] is a high electrical potential, the volume of the cavity CV included in the discharger D[m] is smaller, as compared to when the electrical potential is a low electrical potential.

Next, referring to FIG. 4, an example of the arrangement of nozzles N will be described.

Figure 4:
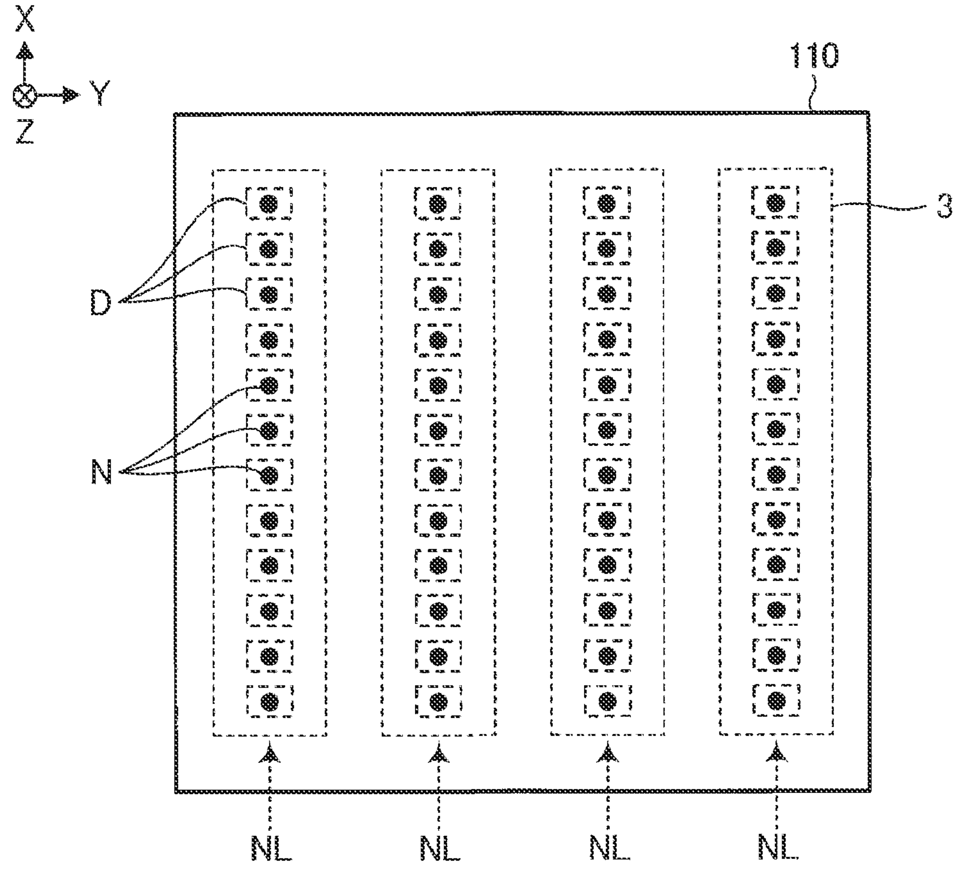
FIG. 4 is a plan view illustrating an example of the arrangement of nozzles in head units.

FIG. 4 is a plan view illustrating an example of the arrangement of nozzles N in the head units 3. FIG. 4 illustrates four head units 3 mounted on the carriage 110, and an example of the arrangement of 4M nozzles N in total provided in the four head units 3 when the ink jet printer 1 is viewed from −Z direction in a plan view.

Each head unit 3 provided in the carriage 110 is provided with a nozzle array NL. The nozzle array NL is a plurality of nozzles N provided to extend in an array in a predetermined direction. In this embodiment, it is assumed that each nozzle array NL consists of M nozzles N arranged to extend in the X direction as an example.

Next, referring to FIG. 5 and FIG. 6, an overview of the head unit 3 will be described.

FIG. 5 is a block diagram illustrating an example of the configuration of the head unit 3.

As described in FIG. 1, the head unit 3 has the supply circuit 31 and the recording head 32. In addition, the head unit 3 has a line La to which a drive signal COMa is supplied from the drive signal generation unit 4, a line Lb to which a drive signal COMb is supplied from the drive signal generation unit 4, and a line Li[m] to supply an individual drive signal Vin[m] to the discharger D[m]. The drive signal COMa is an example of one of the "first drive signal" and the "second drive signal", and the drive signal COMb is an example of the other of the "first drive signal" and the "second drive signal". In this embodiment, the operation of the head unit 3 will be described using the drive signal COMa as an example of the "second drive signal" and the drive signal COMb as an example of the "first drive signal".

The supply circuit 31 has M switches Wa[1] to Wa[M] in one-to-one correspondence with M dischargers D[1] to D[M], M switches Wb[1] to Wb[M] in one-to-one correspondence with the M dischargers D[1] to D[M], and a coupled state specification circuit 310. The coupled state specification circuit 310 specifies the coupled state of each of the M switches Wa and the M switches Wb. For example, the coupled state specification circuit 310 generates coupled state specification signals Qa[m] and Qb[m] based on at least part of print signal SI and latch signal LAT supplied from the control unit 2. The coupled state specification signal Qa[m] is a signal to specify ON/OFF of the switch Wa[m], and the coupled state specification signal Qb[m] is a signal to specify ON/OFF of the switch Wb[m].

The switch Wa[m] switches conduction and non-conduction between the line La and the upper electrode Zu[m] of the piezoelectric element PZ[m] provided in the discharger D[m] based on the coupled state specification signal Qa[m]. In other words, the switch Wa[m] switches conduction and non-conduction between the line La and the line Li[m] coupled to the upper electrode Zu[m] based on the coupled state specification signal Qa[m]. In this embodiment, the switch Wa[m] is turned ON when the coupled state specification signal Qa[m] is at a high level, and is turned OFF when the coupled state specification signal Qa[m] is at a low level. When the switch Wa[m] is turned ON, the drive signal COMa supplied to the line La is supplied to the upper electrode Zu[m] of the discharger D[m] through the line Li[m] as the individual drive signal Vin[m].

The switch Wb[m] switches conduction and non-conduction between the line Lb and the upper electrode Zu[m] of the piezoelectric element PZ[m] provided in the discharger D[m] based on the coupled state specification signal Qb[m]. In other words, the switch Wb[m] switches conduction and non-conduction between the line Lb and the line Li[m] coupled to the upper electrode Zu[m] based on the coupled state specification signal Qb[m]. In this embodiment, the switch Wb[m] is turned ON when the coupled state specification signal Qb[m] is at a high level, and is turned OFF when the coupled state specification signal Qb[m] is at a low level. When the switch Wb[m] is turned ON, the drive signal COMb supplied to the line Lb is supplied to the upper electrode Zu[m] of the discharger D[m] through the line Li[m] as the individual drive signal Vin[m].

Next, referring to FIG. 6, the operation of the head unit 3 will be described.

In this embodiment, when the ink jet printer 1 executes a print process or a flushing process, one or a plurality of unit time periods TP are set as the operation time period of the ink jet printer 1. The ink jet printer 1 according to this embodiment can drive each discharger D[m] for a print process or a flushing process in each unit time period TP.

FIG. 6 is a timing chart for explaining an example of signals supplied to the head unit 3.

The control unit 2 outputs a latch signal LAT having a pulse PLL. Thus, the control unit 2 defines the unit time period TP as the time period from the rise of the pulse PLL to the rise of the next pulse PLL. The unit time period TP is, for example, the drive cycle of M dischargers D. In this embodiment, it is assumed that one cycle of a plurality of drive signals COM is the unit time period TP.

A print signal SI according to this embodiment includes M individual specification signals Sd[1] to Sd[M] in one-to-one correspondence with the M dischargers D[1] to D[M]. When the ink jet printer 1 executes a print process or a flushing process, the individual specification signal Sd[m] specifies the mode of drive of the discharger D[m] in each unit time period TP. For example, before each unit time period TP, the control unit 2 supplies a print signal SI including M individual specification signals Sd[1] to Sd[M] to the coupled state specification circuit 310 in synchronization with a clock signal CL. The coupled state specification circuit 310 then generates a coupled state specification signal Qa[m] and a coupled state specification signal Qb[m] in the unit time period TP based on the individual specification signal Sd[m].

Figure 7:
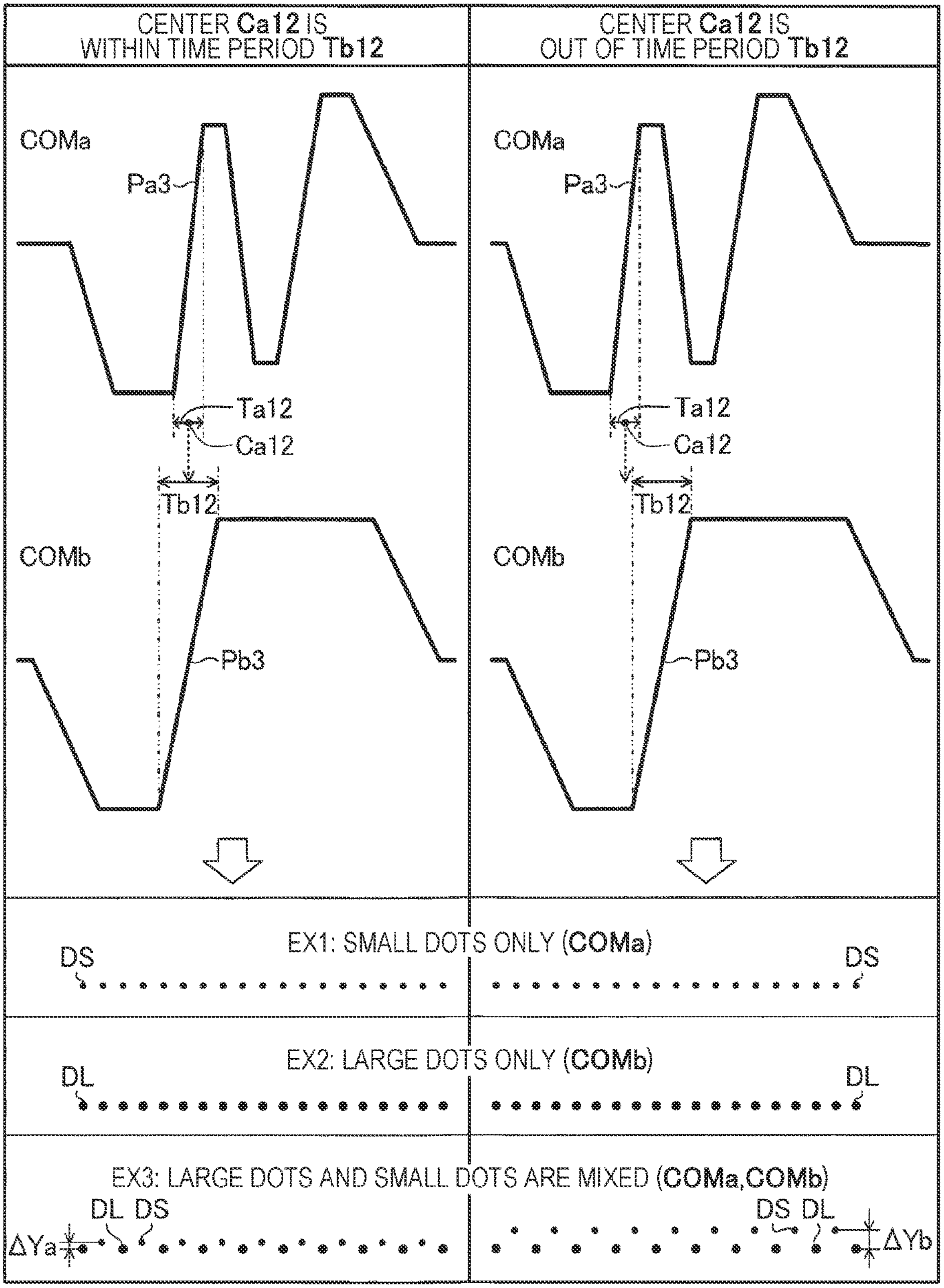
FIG. 7 illustrates explanatory charts for explaining the operation when the drive signals illustrated in FIG. 6 are supplied to the head unit.

In this embodiment, as illustrated in FIG. 7 described later, it is assumed that the discharger D[m] can form one of a large dot DL and a small dot DS smaller than the large dot DL in the unit time period TP in which a print process is executed. For example, in the unit time period TP in which a print process is executed, the discharger D[m] is specified as one of a discharger D to form a large dot DL, a discharger D to form a small dot DS, or a discharger D to form no dot by the individual specification signal Sd[m].

The drive signal COMa has a waveform PA. For example, the drive signal COMa has the pulse of the waveform PA provided in the unit time period TP. The waveform PA is a waveform in which the electrical potential of the drive signal COMa starts from reference potential V0, changes through electrical potential VLa1, electrical potential VHa1, electrical potential VLa2 and electrical potential VHa2, and returns to the reference potential V0. The electrical potential VLa1 and the electrical potential VLa2 are electrical potentials lower than the reference potential V0, and the electrical potential VHa1 and the electrical potential VHa2 are electrical potentials higher than the reference potential V0. The relationship between the electrical potential VLa1 and the electrical potential VLa2, and the relationship between the electrical potential VHa1 and the electrical potential VHa2 are not particularly limited, but are determined based on the characteristics of discharge of ink by the dischargers D. In this embodiment, it is assumed that the electrical potential VLa1 is an electrical potential lower than the electrical potential VLa2, and the electrical potential VHa1 is an electrical potential lower than the electrical potential VHa2. The waveform PA is an example of a "second waveform". The ink discharge characteristics are, for example, the amount of ink discharged as liquid droplets, and the discharge speed of discharged liquid droplets.

In the following, of the waveform PA, the portion in which the electrical potential of the drive signal COMa changes from the reference potential V0 to the electrical potential VLa1 is also referred to as waveform Pa1, and the portion in which the electrical potential of the drive signal COMa is maintained at the electrical potential VLa1 is also referred to as waveform Pa2. In addition, of the waveform PA, the portion in which the electrical potential of the drive signal COMa changes from the electrical potential VLa1 to the electrical potential VHa1 is also referred to as waveform Pa3, and the portion in which the electrical potential of the drive signal COMa is maintained at the electrical potential VHa1 is also referred to as waveform Pa4. Furthermore, of the waveform PA, the portion in which the electrical potential of the drive signal COMa changes from the electrical potential VHa1 to the electrical potential VLa2 is also referred to as waveform Pa5, and the portion in which the electrical potential of the drive signal COMa is maintained at the electrical potential VLa2 is also referred to as waveform Pa6. In addition, of the waveform PA, the portion in which the electrical potential of the drive signal COMa changes from the electrical potential VLa2 to the electrical potential VHa2 is also referred to as waveform Pa7, and the portion in which the electrical potential of the drive signal COMa is maintained at the electrical potential VHa2 is also referred to as waveform Pa8. Also, of the waveform PA, the portion in which the electrical potential of the drive signal COMa changes from the electrical potential VHa2 to the reference potential V0 is also referred to as waveform Pa9. In short, the waveform PA includes the waveforms Pa1, Pa2, Pa3, Pa4, Pa5, Pa6, Pa7, Pa8 and Pa9.

The waveforms Pa1, Pa5 and Pa9 are waveforms to displace the piezoelectric element PZ in +Z direction. Specifically, the waveforms Pa1, Pa5 and Pa9 are waveforms in which the electrical potential of the drive signal COMa changes to cause the volume of the cavity CV to expand. Therefore, of the plurality of elements that form the pulse of the waveform PA, the waveforms Pa1, Pa5 and Pa9 correspond to expansion elements that change the electrical potential of the drive signal COMa to drive the piezoelectric element PZ so as to expand the volume of the cavity CV. Note that the waveform Pa1 is an example of a "second expansion waveform".

The waveforms Pa3 and Pa7 are waveforms to displace the piezoelectric element PZ in −Z direction. Specifically, the waveforms Pa3 and Pa7 are waveforms in which the electrical potential of the drive signal COMa changes to cause the volume of the cavity CV to contract. Therefore, of the plurality of elements that form the pulse of the waveform PA, the waveforms Pa3 and Pa7 correspond to contraction elements that change the electrical potential of the drive signal COMa to drive the piezoelectric element PZ so as to contract the volume of the cavity CV. Note that the waveform Pa3 is an example of a "second contraction waveform".

The waveforms Pa2, Pa4, Pa6 and Pa8 are waveforms to maintain the position of the piezoelectric element PZ in the Z direction. Of the plurality of elements that form the pulse of the waveform PA, for example, the waveforms Pa2 and Pa6 correspond to expansion maintenance elements that maintain the electrical potential of the drive signal COMa to drive the piezoelectric element PZ so as to maintain the volume of the cavity CV expanded by the waveform Pa1 or Pa5. Of the plurality of elements that form the pulse of the waveform PA, for example, the waveforms Pa4 and Pa8 correspond to contraction maintenance elements that maintain the electrical potential of the drive signal COMa to drive the piezoelectric element PZ so as to maintain the volume of the cavity CV contracted by the waveform Pa3 or Pa1.

The waveform PA is determined so that when an individual drive signal Vin[m] having the waveform PA is supplied to the discharger D[m], an amount of ink corresponding to a small dot DS is discharged from the discharger D[m]. The amount of ink corresponding to a small dot DS is an example of a "second amount". In this embodiment, as described in FIG. 3, it is assumed that when the electrical potential of the individual drive signal Vin[m] is a high electrical potential, the volume of the cavity CV included in the discharger D[m] is reduced, as compared to when the electrical potential is a low electrical potential. Thus, when the discharger D[m] is driven by the individual drive signal Vin[m] having the waveform PA, the ink in the discharger D[m] is discharged through the nozzle N by the waveform Pa3 in which the electrical potential of the individual drive signal Vin[m] changes from a low electrical potential to a high electrical potential.

The drive signal COMb has waveform PB. For example, the drive signal COMb has the pulse of the waveform PB provided in the unit time period TP. The waveform PB is a waveform in which the electrical potential of the drive signal COMb starts from the reference potential V0, changes through electrical potential VLb1 lower than the reference potential V0, and electrical potential VHb1 higher than the reference potential V0, and returns to the reference potential V0. The waveform PB is an example of a "first waveform".

In the following, of the waveform PB, the portion in which the electrical potential of the drive signal COMb changes from the reference potential V0 to the electrical potential VLb1 is also referred to as waveform Pb1, and the portion in which the electrical potential of the drive signal COMb is maintained at the electrical potential VLb1 is also referred to as waveform Pb2. In addition, of the waveform PB, the portion in which the electrical potential of the drive signal COMb changes from the electrical potential VLb1 to the electrical potential VHb1 is also referred to as waveform Pb3, and the portion in which the electrical potential of the drive signal COMb is maintained at the electrical potential VHb1 is also referred to as waveform Pb4. Also, of the waveform PB, the portion in which the electrical potential of the drive signal COMb changes from the electrical potential VHb1 to the reference potential V0 is also referred to as waveform Pb5. In short, the waveform PB includes the waveforms Pb1, Pb2, Pb3, Pb4 and Pb5.

The waveforms Pb1 and Pb5 are waveforms to displace the piezoelectric element PZ in +Z direction. Specifically, the waveforms Pb1 and Pb5 are waveforms in which the electrical potential of the drive signal COMb changes to cause the volume of the cavity CV to expand. Therefore, of the plurality of elements that form the pulse of the waveform PB, the waveforms Pb1 and Pb5 correspond to expansion elements that change the electrical potential of the drive signal COMb to drive the piezoelectric element PZ so as to expand the volume of the cavity CV. Note that the waveform Pb1 is an example of a "first expansion waveform".

The waveform Pb3 is a waveform to displace the piezoelectric element PZ in −Z direction. Specifically, the waveform Pb3 is a waveform in which the electrical potential of the drive signal COMb changes to cause the volume of the cavity CV to contract. Therefore, of the plurality of elements that form the pulse of the waveform PB, the waveforms Pb3 corresponds to a contraction element that changes the electrical potential of the drive signal COMb to drive the piezoelectric element PZ so as to contract the volume of the cavity CV. Note that the waveform Pb3 is an example of a "first contraction waveform".

The waveforms Pb2 and Pb4 are waveforms to maintain the position of the piezoelectric element PZ in the Z direction. Of the plurality of elements that form the pulse of the waveform PB, for example, the waveform Pb2 corresponds to an expansion maintenance element that maintains the electrical potential of the drive signal COMb to drive the piezoelectric element PZ so as to maintain the volume of the cavity CV expanded by the waveform Pb1. Of the plurality of elements that form the pulse of the waveform PB, for example, the waveform Pb4 corresponds to a contraction maintenance element that maintains the electrical potential of the drive signal COMb to drive the piezoelectric element PZ so as to maintain the volume of the cavity CV contracted by the waveform Pb3.

The waveform PB is determined so that when an individual drive signal Vin[m] having the waveform PB is supplied to the discharger D[m], an amount of ink corresponding to a large dot DL is discharged from the discharger D[m]. The amount of ink corresponding to a large dot DL is an example of a "first amount". When the discharger D[m] is driven by an individual drive signal Vin[m] having the waveform PB, the ink in the discharger D[m] is discharged through the nozzle N by the waveform Pb3 in which the electrical potential of the individual drive signal Vin[m] changes from a low electrical potential to a high electrical potential.

Like this, in this embodiment, the drive signal COMa includes only the pulse of the waveform PA to perform a discharge operation once within the unit time period TP, and the drive signal COMb includes only the pulse of the waveform PB to perform a discharge operation once within the unit time period TP. Thus, in this embodiment, for example, even when the discharger D is driven with a cycle higher than or equal to 50 kHz, deterioration of the discharge characteristics can be reduced. Note that each of the drive signals COMa and COMb may have a pulse to perform a discharge operation twice or more within the unit time period TP.

Here, it has been verified by an experiment of the inventor that change in the characteristics of discharge of ink by the dischargers D is prevented by matching a first timing and a second timing in the unit time period TP, the first timing being center Cb12 of time period Tb12 of the waveform Pb3, the second timing being center Ca12 of time period Ta12 of the waveform Pa3. Note that in the present specification, "matching" includes substantial matching in consideration of an error, in addition to complete matching.

In the example illustrated in FIG. 6, the first timing that is the center Cb12 of the time period Tb12 of the waveform Pb3 of the drive signal COMb matches the second timing that is the center Ca12 of the time period Ta12 of the waveform Pa3 of the drive signal COMa in the unit time period TP. Consequently, in this embodiment, change in the characteristics of discharge of ink by the dischargers D can be prevented.

Although the first timing that is the center Cb12 of the time period Tb12 of the waveform Pb3 may match the second timing that is the center Ca12 of the time period Ta12 of the waveform Pa3, the first timing may not match the second timing. For example, as long as the center of one of the time period Ta12 of the waveform Pa3 and the time period Tb12 of the waveform Pb3 is located within the other of the time period Ta12 and the time period Tb12 in the unit time period TP, the first timing may not match the second timing. Even in this situation, change in the characteristics of discharge of ink by the dischargers D can be prevented.

In the example illustrated in FIG. 6, the center of one of time period Ta10 of the waveform Pa1 of the drive signal COMa and time period Tb10 of the waveform Pb1 of the drive signal COMb is located within the other of the time period Ta10 and the time period Tb10 in the unit time period TP. For example, the center Ca10 of the time period Ta10 of the waveform Pa1 of the drive signal COMa is located within the time period Tb10 of the waveform Pb1 of the drive signal COMb in the unit time period TP. In the example illustrated in FIG. 6, the center Cb10 of the time period Tb10 of the waveform Pb1 is located outside the time period Ta10 of the waveform Pa1 in the unit time period TP; however, the center Cb10 may be located within the time period Ta10 of the waveform Pa1.

Next, the operation of this embodiment when compared with a comparative example in which the center Ca12 of the time period Ta12 of the waveform Pa3 is located outside the time period Tb12 of the waveform Pb3 will be described with reference to FIG. 7.

FIG. 7 illustrates explanatory charts for explaining the operation when the drive signals COMa and COMb illustrated in FIG. 6 are supplied to the head unit 3. The column on the left side of FIG. 7 shows this embodiment in which the center Ca12 of the time period Ta12 of the waveform Pa3 is located within the time period Tb12 of the waveform Pb3. The column on the right side of FIG. 7 shows, as an embodiment to be compared with this embodiment, a comparative example in which the center Ca12 of the time period Ta12 of the waveform Pa3 is located outside the time period Tb12 of the waveform Pb3.

Note that FIG. 7 illustrates an experimental result when the drive signal COMa and the drive signal COMb of each of this embodiment and the comparative example are designed so that the landing positions of the ink droplets discharged from the M dischargers D match in the Y direction provided that the ink droplets discharged from the M dischargers D are all small dots DS or all large dots DL in the same unit time period TP. As described above, this embodiment and the comparative example differ depending on whether the center Ca12 of the time period Ta12 of the waveform Pa3 is located within the time period Tb12 of the waveform Pb3 or located outside the time period Tb12 of the waveform Pb3, and other configurations are common. In FIG. 7, when ink for a large dot DL is discharged from the discharger D, the ink discharged from the discharger D is separated into a main droplet and a satellite droplet smaller than the main droplet; however, to facilitate the description, the satellite droplet is not illustrated.

When one of two adjacent dischargers D among the M dischargers D discharges ink for a large dot DL, and the other of the two adjacent dischargers D discharges ink for a small dot DS in the same unit time period TP, the landing position of the ink in the Y direction is different between the large dot DL and the small dot DS. In this embodiment in which the center Ca12 of the time period Ta12 of the waveform Pa3 is located within the time period Tb12 of the waveform Pb3, the difference ΔYa between the landing positions of the large dot DL and the small dot DS is smaller than the difference ΔYb between the landing positions of the large dot DL and the small dot DS in the comparative example. In other words, in this embodiment, when large dots DL and small dots DS are mixed in the same unit time period TP, the deviation between the landing position of ink for a large dot DL and the landing position of ink for a small dot DS can be reduced to a level smaller than in the comparative example. As a result, in this embodiment, deterioration of the quality of printed image can be reduced. In addition, the smallness of the deviation between the landing position of ink for a large dot DL and the landing position of ink for a small dot DS demonstrates a small change in the characteristics of discharge of ink between a case in which dots with the same size are discharged from the M dischargers D and a case in which dots with different sizes are discharged from the M dischargers D in the same unit time period TP. Therefore, in this embodiment, change in the characteristics of discharge of ink can be prevented by a combination the sizes of dots discharged from the M dischargers D in the same unit time period TP.

Next, referring to FIG. 8, in the comparative example shown in the column on the right side of FIG. 7, a cause of deviation occurs between the landing position of ink for a large dot DL and the landing position of ink for a small dot DS will be described, where large dots DL and small dots DS are mixed in the discharge from the M dischargers D in the same unit time period TP.

Figure 8:
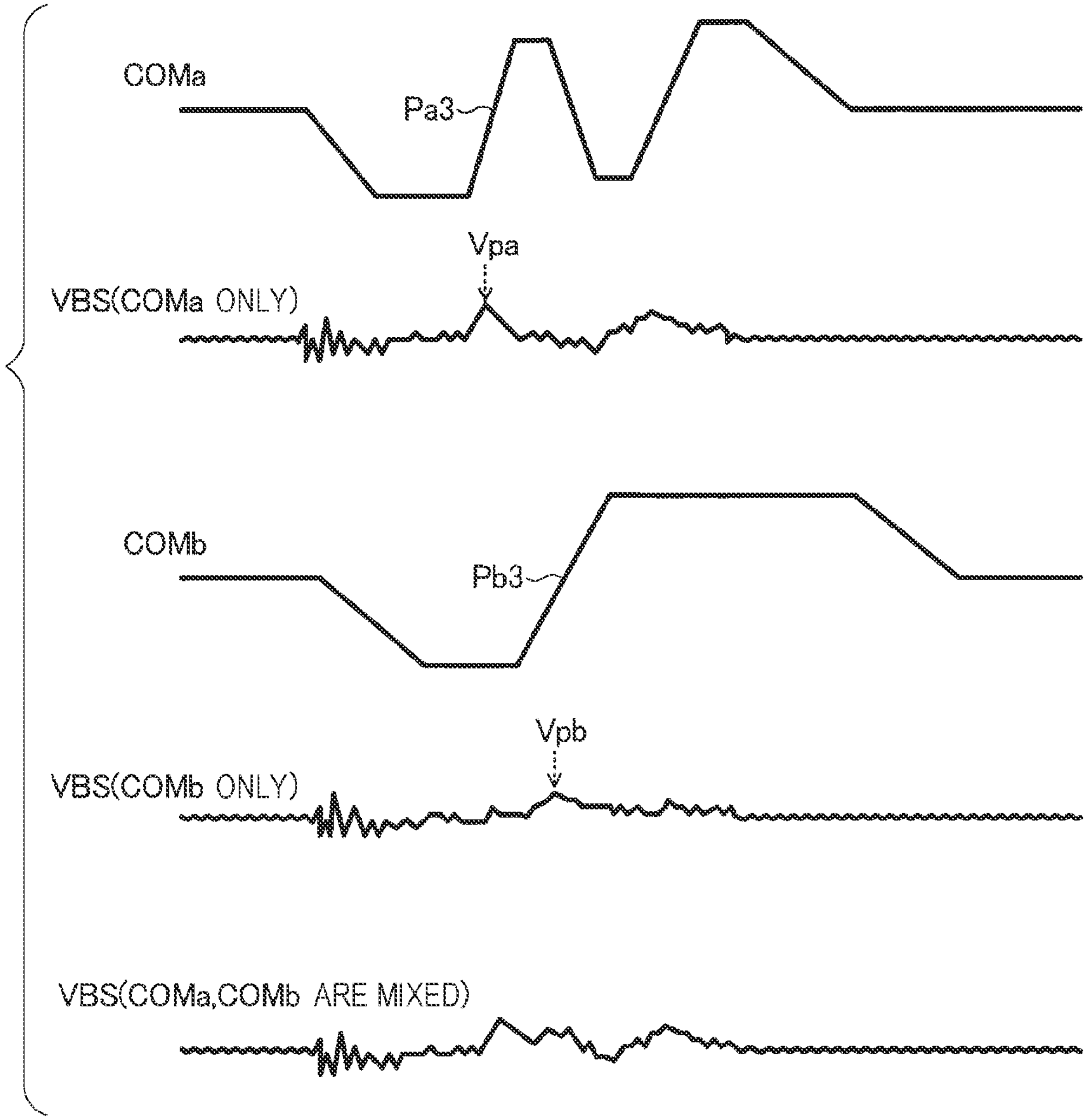
FIG. 8 illustrates explanatory charts for explaining a cause of deviation of landing positions of ink when large dots and small dots are mixed.

FIG. 8 illustrates explanatory charts for explaining a cause of deviation of landing positions of ink when large dots DL and small dots DS are mixed in the discharge from the M dischargers D in the same unit time period TP in the comparative example.

When the ink droplets discharged from the M dischargers D are all small dots DS in the same unit time period TP, all individual drive signals Vin supplied to the M dischargers D are drive signals COMa. In addition, when the ink droplets discharged from the M dischargers D are all large dots DL in the same unit time period TP, all individual drive signals Vin supplied to the M dischargers D are drive signals COMb. Note that in the following, the drive signals COMa and COMb may be referred to as the drive signal COM without particularly distinguishing therebetween.

An individual drive signal Vin[m] is supplied to the upper electrode Zu[m] of each of the M dischargers D, whereas a bias voltage signal VBS to maintain a constant voltage is supplied to the lower electrodes Zd[1] to Zd[M] of the M dischargers D in common by line Ld. When the electrical potential of the bias voltage signal VBS changes according to increase/decrease of current flowing along with electrical potential change of the individual drive signal Vin[m] supplied to the upper electrode Zu[m], the electrical potential of the bias voltage signal VBS changes in the lower electrodes Zd[1] to Zd[M] of all the dischargers D.

For example, when the ink droplets discharged from the M dischargers D are all small dots DS and when the ink droplets discharged from the M dischargers D are all large dots DL in the same unit time period TP, the electrical potential of the bias voltage signal VBS changes at a timing of electrical potential change of the drive signal COM. As illustrated in the bias voltage signal VBS (COMa only) in the second chart of FIG. 8, when the ink droplets discharged from the M dischargers D are all small dots DS in the same unit time period TP, the electrical potential of the bias voltage signal VBS changes in the portions corresponding to the waveform Pa1, the waveform Pa3, the waveform Pa5, and the waveform Pa1 in which the electrical potential changes. Particularly, in the portion corresponding to the waveform Pa3 where the amount of change in electrical potential and the width of change in electrical potential per unit time are larger than in other portions, a significant change including peak Vpa is observed. In contrast, variation in the electrical potential of the bias voltage signal VBS is small in the portions corresponding to the waveform Pa2, the waveform Pa4, the waveform Pa6, and the waveform Pa8 in which the electrical potential is maintained, and the waveform Pa9 in which the electrical potential gradually changes. Similarly, as illustrated in the bias voltage signal VBS (COMb only) in the fourth chart of FIG. 8, when the ink droplets discharged from the M dischargers D are all large dots DL in the same unit time period TP, the electrical potential of the bias voltage signal VBS significantly changes in the portions corresponding to the waveform Pb1, and the waveform Pb3 in which the electrical potential changes. Particularly, in the portion corresponding to the waveform Pb3 where the amount of change in electrical potential and the width of change in electrical potential per unit time are larger than in other portions, a significant change including peak Vpb is observed. In contrast, variation in the electrical potential of the bias voltage signal VBS is small in the portions corresponding to the waveform Pb2, and the waveform Pb4 in which the electrical potential is maintained, and the waveform Pb5 in which the electrical potential gradually changes. In short, the electrical potential of the bias voltage signal VBS supplied to the lower electrode Zd of the piezoelectric element PZ fluctuates according to the electrical potential change of the drive signal COM. Thus, when large dots DL and small dots DS are mixed in the discharge from the M dischargers D in the same unit time period TP, the electrical potential of the bias voltage signal VBS is affected by both of the electrical potential change according to the drive signal COMa and the electrical potential change according to the drive signal COMb. As illustrated in the bias voltage signal VBS (COMa, COMb are mixed) in the fifth chart of FIG. 8, when large dots DL and small dots DS are mixed in the ink discharged from the M dischargers D in the same unit time period TP, the electrical potential of the bias voltage signal VBS significantly changes in the portions corresponding to the waveform Pa1, the waveform Pa3, the waveform Pa5, and the waveform Pa7 in which the electrical potential of the drive signal COMa changes as well as the waveform Pb1, and the waveform Pb3 in which the electrical potential of the drive signal COMb changes. For example, the electrical potential of the bias voltage signal VBS changes to an electrical potential corresponding to the sum of an electrical potential changed due to change of the drive signal COMa and an electrical potential changed due to change of the drive signal COMb. Therefore, when large dots DL and small dots DS are mixed, the electrical potential of the bias voltage signal VBS may change even at a timing at which no change in electrical potential occurs when the ink droplets discharged from the M dischargers D are all large dots DL. For example, the portion corresponding to the waveform Pb2 in which variation in the electrical potential is small in the bias voltage signal VBS (COMb only) includes peak Vpa, and exhibits a significant change in electrical potential in the bias voltage signal VBS (COMa, COMb are mixed) due to the effect of the waveform Pa3 of the drive signal COMa.

Like this, when large dots DL and small dots DS are mixed in the discharge from the M dischargers D in the same unit time period TP in the comparative example, for example, the potential difference between the drive signal COMb and the bias voltage signal VBS is different from the potential difference between the drive signal COMb and the bias voltage signal VBS when the ink droplets discharged from the M dischargers D are all large dots DL. For example, when the potential difference between the drive signal COMb and the bias voltage signal VBS is different from the value assumed in design, the characteristics of discharge of ink by the dischargers D deviate from assumed characteristics. As illustrated in FIG. 8, when the ink droplets discharged from the M dischargers D are all large dots DL, the portion corresponding to the waveform Pb2 of the drive signal COMb of the bias voltage signal VBS exhibits no significant change; however, when large dots DL and small dots DS are mixed, the portion changes due to the effect of the waveform Pa3 of the drive signal COMa. In contrast, in the portion corresponding to the waveform Pa2 of the drive signal COMa of the bias voltage signal VBS, a change state when the ink droplets discharged from the M dischargers D are all small dots DS, and a change state when large dots DL and small dots DS are mixed are similar. Thus, in the comparative example in which the drive signals are designed so that the landing position when the ink droplets discharged from the M dischargers D are all large dots DL matches the landing position when the ink droplets discharged from the M dischargers D are all small dots DS, when large dots DL and small dots DS are mixed, deviation of the landing position of ink occurs between large dots DL and small dots DS.

Next, referring to FIG. 9, the effect of electrical potential change of the bias voltage signal VBS on the potential difference between the drive signal COMb and the bias voltage signal VBS in the comparative example will be described.

Figure 9:
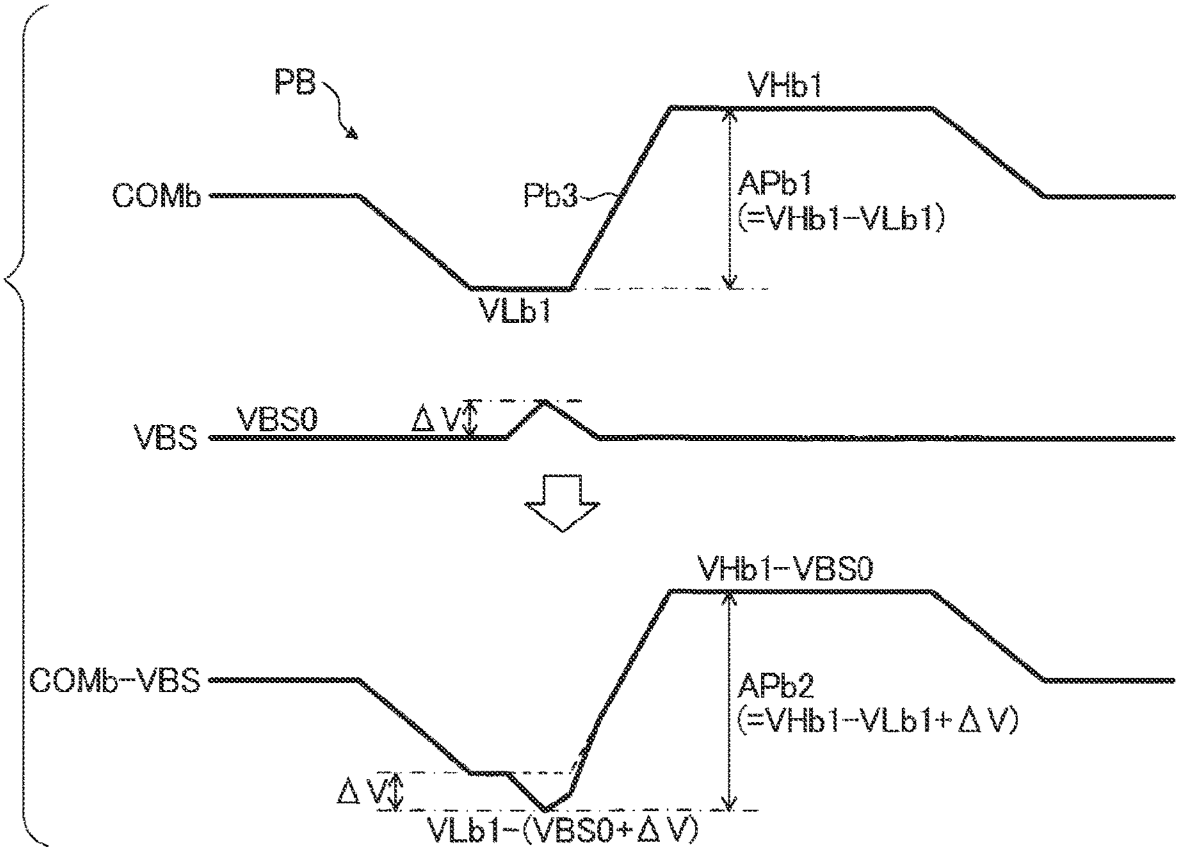
FIG. 9 illustrates explanatory charts for explaining an effect of an electrical potential change of a bias voltage signal on the potential difference between a drive signal and the bias voltage signal.

FIG. 9 illustrates explanatory charts for explaining the effect of electrical potential change of the bias voltage signal VBS on the potential difference between the drive signal COMb supplied to the upper electrode Zu[m] of the discharger D[m] that discharges a large dot DL, and the bias voltage signal VBS when large dots DL and small dots DS are mixed in the discharge from the M dischargers D in the same unit time period TP in the comparative example. The first chart of FIG. 9 shows the drive signal COMb in the comparative example, as the individual drive signal Vin[m] supplied to the upper electrode Zu[m]. The second chart of FIG. 9 shows the bias voltage signal VBS supplied to the lower electrode Zd[m]. The third chart of FIG. 9 shows the potential difference COMb-VBS between the drive signal COMb in the discharger D[m] and the bias voltage signal VBS. In FIG. 9, in order to facilitate the description of change of the discharge characteristics caused by the contraction elements of the drive signal COMb depending on whether electrical potential change of the bias voltage signal VBS occurs due to the effect of the waveform Pa3 of the drive signal COMa, electrical potential change of the bias voltage signal VBS due to the effect of the waveforms other than the waveform Pa3 is not illustrated.

As described in FIG. 2, the piezoelectric element PZ is displaced according to the potential difference between the drive signal COMb supplied to the upper electrode Zu and the bias voltage signal VBS supplied to the lower electrode Zd. For example, as in the comparative example, when a peak of the electrical potential change of the bias voltage signal VBS due to the effect of electrical potential change of the waveform Pa3 of the drive signal COMa occurs before the start of the waveform Pb3 which is a contraction element of the drive signal COMb, the amount of change corresponding to the contraction element for the potential difference between the drive signal COMb and the bias voltage signal VBS increases, as compared to when the electrical potential of the bias voltage signal VBS does not change before the start of the waveform Pb3.

In the example illustrated in FIG. 9, the electrical potential of the bias voltage signal VBS increases from electrical potential VBS0 by electrical potential ΔV before the start of the waveform Pb3. This is because the time period Ta12 of the waveform Pa3 is located before the time period Tb12 of the waveform Pb3, and the electrical potential of the bias voltage signal VBS increases by the electrical potential ΔV according to increase/decrease of current along with electrical potential change of the waveform Pa3. The electrical potential of the bias voltage signal VBS then returns to the original electrical potential VBS0 before the electrical potential of the drive signal COMb reaches the electrical potential VHb1. In this situation, the difference between the electrical potential VLb1 and the value obtained by adding the electrical potential ΔV to the electrical potential VBS0 corresponds to the start point of the amount of change corresponding to the contraction element for the potential difference between the drive signal COMb and the bias voltage signal VBS. In addition, the difference between the electrical potential VHb1 and the electrical potential VBS0 corresponds to the end point of the amount of change corresponding to the contraction element for the potential difference between the drive signal COMb and the bias voltage signal VBS. Therefore, the value obtained by adding the electrical potential ΔV to the difference between the electrical potential VHb1 and the electrical potential VLb1 corresponds to amount of change APb2 corresponding to the contraction element for the potential difference between the drive signal COMb and the bias voltage signal VBS.

In contrast, when the electrical potential of the bias voltage signal VBS does not change by the waveform Pa3 before the time period Tb12 of the waveform Pb3, the difference between the electrical potential VHb1 and the electrical potential VLb1 corresponds to amount of change APb1 corresponding to the contraction element for the potential difference between the drive signal COMb and the bias voltage signal VBS. In the following, the amounts of change APb1 and APb2 corresponding to the contraction elements for the potential difference between the drive signal COMb and the bias voltage signal VBS may be collectively referred to as the amount of change APb. For example, when an increase peak of the electrical potential change of the bias voltage signal VBS occurs before the start of the waveform Pb3 which is a contraction element, the amount of change APb increases, as compared to when the electrical potential of the bias voltage signal VBS does not change before the start of the waveform Pb3. In the example illustrated in FIG. 9, the amount of change APb2 is the value obtained by adding the electrical potential ΔV to the amount of change APb1.

When the amount of change APb corresponding to the contraction element for the potential difference between the drive signal COMb and the bias voltage signal VBS increases, the amount of displacement of the piezoelectric element PZ increases, and the discharge speed of liquid droplets increases. Specifically, when an increase peak of the electrical potential change of the bias voltage signal VBS occurs before the start of the waveform Pb3 which is a contraction element, the amount of displacement of the piezoelectric element PZ increases, and the discharge speed increases. For example, in the comparative example illustrated in FIG. 8, an increase peak of the electrical potential change of the bias voltage signal VBS (COMa, COMb are mixed) corresponding to the peak Vpa by the waveform Pa3 occurs before the start of the waveform Pb3 which is a contraction element, thus the characteristics of discharge of ink by the dischargers D that discharge large dots DL are changed. In contrast, in this embodiment, when large dots DL and small dots DS are mixed in the discharge from the M dischargers D in the same unit time period TP, the center Ca12 of the time period Ta12 of the waveform Pa3 is located within the time period Tb12 of the waveform Pb3, thereby making it possible to reduce the effect of the electrical potential change of the bias voltage signal VBS on the characteristics of discharge of ink by the dischargers D that discharge large dots DL. As another comparative example, when the time period Tb12 of the waveform Pb3 of the drive signal COMb is located before the time period Ta12 of the waveform Pa3 of the drive signal COMa, an increase peak of the bias voltage signal VBS according to increase/decrease of current along with electrical potential change of the waveform Pa3 occurs before the start of the waveform Pa3 which is a contraction element, thus the characteristics of discharge of ink by the dischargers D that discharges small dots DS are changed. In contrast, in this embodiment, when large dots DL and small dots DS are mixed in the discharge from the M dischargers D in the same unit time period TP, the center Cb12 of the time period Tb12 of the waveform Pb3 is located within the time period Ta12 of the waveform Pa3, thereby making it possible to reduce the effect of the electrical potential change of the bias voltage signal VBS on the characteristics of discharge of ink by the dischargers D that discharge small dots DS.

As described in FIG. 6 and other figures, in this embodiment, the center of one of the time period Ta12 of the waveform Pa3 of the drive signal COMa and the time period Tb12 of the waveform Pb3 of the drive signal COMb is located within the other of the time periods Ta12 and Tb12 in the unit time period TP. Consequently, in this embodiment, for example, the timing of the peak Vpa of the electrical potential change of the bias voltage signal VBS by the waveform Pa3, and the timing of the peak Vpb of the electrical potential change of the bias voltage signal VBS by the waveform Pb3 can be brought close to each other. As a result, in this embodiment, when large dots DL and small dots DS are mixed, change in the electrical potential of the bias voltage signal VBS can be prevented at the timing at which no electrical potential change of the bias voltage signal VBS occurs when the ink droplets discharged from the M dischargers D are all large dots DL or all small dots DS. Therefore, in this embodiment, change in the characteristics of discharge of ink by the dischargers D can be prevented.

When attention is focused on the electrical potential change of the bias voltage signal VBS, the drive signals COMa and COMb may be determined as follows. For example, the drive signals COMa and COMb may be determined so that the timing of the peak Vpb of the electrical potential change of the bias voltage signal VBS by the waveform Pb3 matches the timing of the peak Vpa of the electrical potential change of the bias voltage signal VBS by the waveform Pa3. Even in this form, when large dots DL and small dots DS are mixed, change in the electrical potential of the bias voltage signal VBS can be prevented at the timing at which no electrical potential change of the bias voltage signal VBS occurs when the ink droplets discharged from the M dischargers D are all large dots DL or all small dots DS.

Note that the timing of the peak Vpb of the electrical potential change of the bias voltage signal VBS by the waveform Pb3 corresponds to the timing of the highest fluctuation of the electrical potential of the lower electrode Zd in the time period Tb12 of the waveform Pb3 in the piezoelectric element PZ to which an individual drive signal Vin including the waveform Pb3 is supplied. In addition, the timing of the peak Vpa of the electrical potential change of the bias voltage signal VBS by the waveform Pa3 corresponds to the timing of the highest fluctuation of the electrical potential of the lower electrode Zd in the time period Ta12 of the waveform Pa3 in the piezoelectric element PZ to which an individual drive signal Vin including the waveform Pa3 is supplied.

For example, it is assumed that the individual drive signal Vin[m] supplied to the discharger D[m] includes the waveform Pb3, and the individual drive signal Vin[n] supplied to the discharger D[n] includes the waveform Pa3, where variable n is a natural number different from variable m and "$1 \le n \le M$". In this situation, one of the dischargers D[m] and D[n] is an example of a "first discharger", and the other of the dischargers D[m] and D[n] is an example of a "second discharger". Also, one of the lower electrodes Zd[m] and Zd[n] is an example of a "first bias electrode", and the other of the lower electrodes Zd[m] and Zd[n] is an example of a "second bias electrode". For example, when the discharger D[m] corresponds to the "first discharger", the lower electrode Zd[m] corresponds to the "first bias electrode". In the above assumption, the timing of the highest fluctuation of the electrical potential of the lower electrode Zd[m] in the time period Tb12 of the waveform Pb3 in the unit time period TP may be made to match the timing of the highest fluctuation of the electrical potential of the lower electrode Zd[n] in the time period Ta12 of the waveform Pa3. Even in this situation, change in the characteristics of discharge of ink by the dischargers D can be prevented.

Next, referring to FIG. 10, an experimental result when the timing relationship between the drive signal COMa and the drive signal COMb is changed will be described.

FIG. 10 is an explanatory chart showing an experimental result when the timing relationship between the drive signal COMa for a small dot and the drive signal COMb for a large dot is changed.

The timing difference of FIG. 10 indicates the rate the difference between a first timing and a second timing to the time period Tb12, the first timing being the center Cb12 of the time period Tb12 of the waveform Pb3 of the drive signal COMb, the second timing being the center Ca12 of the time period Ta12 of the waveform Pa3 of the drive signal COMa. In the following, the rate the difference between the first timing and the second timing to the time period Tb12 is also referred to as the timing difference between the waveforms Pa3 and Pb3, where the first timing is the center Cb12 of the time period Tb12 of the waveform Pb3, and the second timing is the center Ca12 of the time period Ta12 of the waveform Pa3.

The double circles of FIG. 10 show that when large dots DL and small dots DS are mixed, the relationship between the landing positions of ink for the large dots DL and the landing positions of ink for the small dots DS is good. The single circles of FIG. 10 show that when large dots DL and small dots DS are mixed, the difference between the landing positions of ink for the large dots DL and the small dots DS is in an acceptable range. The triangles of FIG. 10 show that when large dots DL and small dots DS are mixed, the difference between the landing positions of ink for the large dots DL and the small dots DS is out of an acceptable range.

As illustrated in FIG. 10, when the timing difference between the waveforms Pa3 and Pb3 is less than or equal to ±5%, the relationship between the landing positions of ink for large dots DL and the landing positions of ink for small dots DS is good. For example, when the timing difference between the waveforms Pa3 and Pb3 is less than or equal to ±5%, the landing positions of ink for large dots DL match the landing positions of ink for small dots DS. Or when the timing difference between the waveforms Pa3 and Pb3 is less than or equal to ±5%, the difference between the landing positions of ink for large dots DL and small dots DS is small. When the timing difference between the waveforms Pa3 and Pb3 is less than or equal to ±15%, and large dots DL and small dots DS are mixed, the difference between the landing positions of ink for large dots DL and small dots DS is in an acceptable range. When the timing difference between the waveforms Pa3 and Pb3 is greater than or equal to ±20%, and large dots DL and small dots DS are mixed, the difference between the landing positions of ink for large dots DL and small dots DS is out of an acceptable range.

Thus, in this embodiment, the center of one of the time period Ta12 of the waveform Pa3 of the drive signal COMa and the time period Tb12 of the waveform Pb3 of the drive signal COMb is located within the other of the time periods Ta12 and Tb12 in the unit time period TP. In the unit time period TP, the difference between the first timing that is the center Cb12 of the time period Tb12 of the waveform Pb3 of the drive signal COMb and the second timing that is the center Ca12 of the time period Ta12 of the waveform Pa3 of the drive signal COMa may be less than or equal to ±15% of the time period Tb12. In the unit time period TP, the first timing that is the center Cb12 of the time period Tb12 of the waveform Pb3 may match the second timing that is the center Ca12 of the time period Ta12 of the waveform Pa3.

In this embodiment described above, the ink jet printer 1 has the nozzle N to discharge ink, the cavity CV communicating with the nozzle N, the plurality of dischargers D including the piezoelectric element PZ that causes the ink in the cavity CV to be discharged through the nozzle N, and the supply circuit 31. The supply circuit 31 generates, for each of the plurality of dischargers D, an individual drive signal Vin to drive the piezoelectric element PZ included in the discharger D based on the plurality of drive signals COM including the drive signal COMb having the waveform PB, and the drive signal COMa having the waveform PA different from the waveform PB. The waveform PB includes the waveform Pb3 in which the electrical potential of the drive signal COMb changes to cause the volume of the cavity CV to contract. The waveform PA includes the waveform Pa3 in which the electrical potential of the drive signal COMa changes to cause the volume of the cavity CV to contract. In one cycle of the plurality of drive signals COM, for example, in the unit time period TP, the center of one of the time period Tb12 of the waveform Pb3 of the drive signal COMb and the time period Ta12 of the waveform Pa3 of the drive signal COMa is located within the other time period.

Like this, in this embodiment, in the unit time period TP, the center of one of the time period Tb12 of the waveform Pb3 and the time period Ta12 of the waveform Pa3 of the drive signal COMa is located within the other time period. Thus, in this embodiment, for example, even when the electrical potential of the bias voltage signal VBS supplied to the piezoelectric element PZ is varied by the waveforms Pa3 and Pb3, the effect of the electrical potential change of the bias voltage signal VBS on the characteristics of discharge of ink by the dischargers D can be reduced. In this embodiment, for example, the timing of the peak Vpa of the electrical potential change of the bias voltage signal VBS by the waveform Pa3, and the timing of the peak Vpb of the electrical potential change of the bias voltage signal VBS by the waveform Pb3 can be brought close to each other. As a result, in this embodiment, when some individual drive signals Vin including the waveform PB and some individual drive signals Vin including the waveform PA are mixed, change in the electrical potential of the bias voltage signal VBS can be prevented at the timing at which no change in electrical potential is made originally. For example, when all individual drive signals Vin include only the waveform PA or when all individual drive signals Vin include only the waveform PB, timing at which the electrical potential of the bias voltage signal VBS does not change corresponds to a timing at which no change in electrical potential is made originally. Like this, in this embodiment, change in the electrical potential of the bias voltage signal VBS can be prevented at the timing at which no change in electrical potential is made originally, thus change in the characteristics of discharge of ink by the dischargers D can be prevented. As a result, in this embodiment, deviation of the landing position of ink from a predetermined position can be prevented, thus deterioration of the quality of printed image can be reduced.

In this embodiment, the ink jet printer 1 has the lower electrode Zd[m] which is provided in the discharger D[m] among the plurality of dischargers D and to which the bias voltage signal VBS is supplied, and the lower electrode Zd[n] which is provided in the discharger D[n] among the plurality of dischargers D and to which the bias voltage signal VBS is supplied. In addition, the ink jet printer 1 has the line Ld to supply the bias voltage signal VBS to the lower electrode Zd[m] and the lower electrode Zd[n]. When the individual drive signal Vin[m] supplied to the discharger D[m] includes the waveform Pb3, and the individual drive signal Vin[n] supplied to the discharger D[n] includes the waveform Pa3, the timing of the highest fluctuation of the electrical potential of the lower electrode Zd[m] in the time period Tb12 of the waveform Pb3 in the unit time period TP matches the timing of the highest fluctuation of the electrical potential of the lower electrode Zd[n] in the time period Ta12 of the waveform Pa3.

Even in this situation, change in the electrical potential of the bias voltage signal VBS can be prevented at the timing at which no change in electrical potential is made originally, thus change in the characteristics of discharge of ink by the dischargers D can be prevented.

In this embodiment, in the unit time period TP, the difference between the first timing that is the center Cb12 of the time period Tb12 of the waveform Pb3 of the drive signal COMb and the second timing that is the center Ca12 of the time period Ta12 of the waveform Pa3 of the drive signal COMa may be less than or equal to ±15% of the time period Tb12 of the waveform Pb3. Even in this situation, change in the electrical potential of the bias voltage signal VBS can be prevented at the timing at which no change in electrical potential is made originally, thus change in the characteristics of discharge of ink by the dischargers D can be prevented.

In addition, in this embodiment, the first timing that is the center Cbl2 of the time period Tb12 of the waveform Pb3 may match the second timing that is the center Ca12 of the time period Ta12 of the waveform Pa3. In this situation, electrical potential change of the bias voltage signal VBS can be further prevented at the timing at which no change in electrical potential is made originally. Therefore, when the first timing matches the second timing, change in the characteristics of discharge of ink by the dischargers D can be further prevented.

The setting of timing for the waveform Pa3 of the drive signal COMa and the waveform Pb3 of the drive signal COMb has been described so far. Similarly, it is possible to set timing for the waveform Pa1, the waveform Pa3, the waveform Pa5, and the waveform Pa1 of the drive signal COMa, and the waveform Pb1, and the waveform Pb3 of the drive signal COMb, which cause a change in electrical potential to occur in the bias voltage signal VBS. In this embodiment, the waveform PB further includes the waveform Pb1 in which the electrical potential of the drive signal COMb changes to cause the volume of the cavity CV to expand. The waveform PA further includes the waveform Pa1 in which the electrical potential of the drive signal COMa changes to cause the volume of the cavity CV to expand. The waveform Pb3 occurs after the time period Tb10 of the waveform Pb1. The volume of the cavity CV expanded by the electrical potential change of the waveform Pb1 is contracted by the electrical potential change of the waveform Pb3. The waveform Pa3 occurs after the time period Ta10 of the waveform Pa1. The volume of the cavity CV expanded by the electrical potential change of the waveform Pa1 is contracted by the electrical potential change of the waveform Pa3. In the unit time period TP, the center of one of the time period Tb10 of the waveform Pb1 of the drive signal COMb and the time period Ta10 of the waveform Pa1 of the drive signal COMa is located within the other time period. Even in this situation, change in the electrical potential of the bias voltage signal VBS can be prevented at the timing at which no change in electrical potential is made originally, thus change in the characteristics of discharge of ink by the dischargers D can be prevented. In particular, by setting the waveform Pa1, the waveform Pb1, the waveform Pa3, and the waveform Pb3 in which the electrical potential changes before ink is discharged through the nozzle N so that change in the electrical potential of the bias voltage signal VBS is prevented at the timing at which no change in electrical potential is made originally, change in the characteristics of discharge of ink by the dischargers D can be further prevented.

In this embodiment, when driven by the electrical potential change of the waveform Pb3, the piezoelectric element PZ contracts the volume of the cavity CV and discharges a first amount of ink through the nozzle N. The first amount is, for example, an amount of ink corresponding to a large dot DL. When driven by the electrical potential change of the waveform Pa3, the piezoelectric element PZ contracts the volume of the cavity CV and discharges a second amount of ink through the nozzle N. The second amount is, for example, an amount of ink corresponding to a small dot DS. In this situation, for example, even when large dots DL and small dots DS are mixed, change in the electrical potential of the bias voltage signal VBS can be prevented at the timing at which no electrical potential change of the bias voltage signal VBS occurs when the ink droplets discharged from the plurality of dischargers D are all large dots DL or all small dots DS. Therefore, even in this situation, change in the electrical potential of the bias voltage signal VBS can be prevented at the timing at which no change in electrical potential is made originally, thus change in the characteristics of discharge of ink by the dischargers D can be prevented.

2. Modifications

The embodiments above can be modified in a variety of manners. Aspects of specific modifications will be exemplified below. Two or more aspects arbitrarily selected from the illustrations below may be combined as appropriate in a range with consistency. Note that in the modifications exemplified below, for the components having equivalent operations and functions to those of the embodiment, the symbols referenced in the above description are used, and a detailed description of each component is omitted as appropriate.

First Modification

In the embodiment described above, an example has been shown in which the plurality of drive signals COM includes the drive signals COMa and COMb; however, the present disclosure is not limited to this aspect. For example, the plurality of drive signals COM may include a drive signal COMc illustrated in FIG. 11 in addition to the drive signals COMa and COMb.

Figure 11:
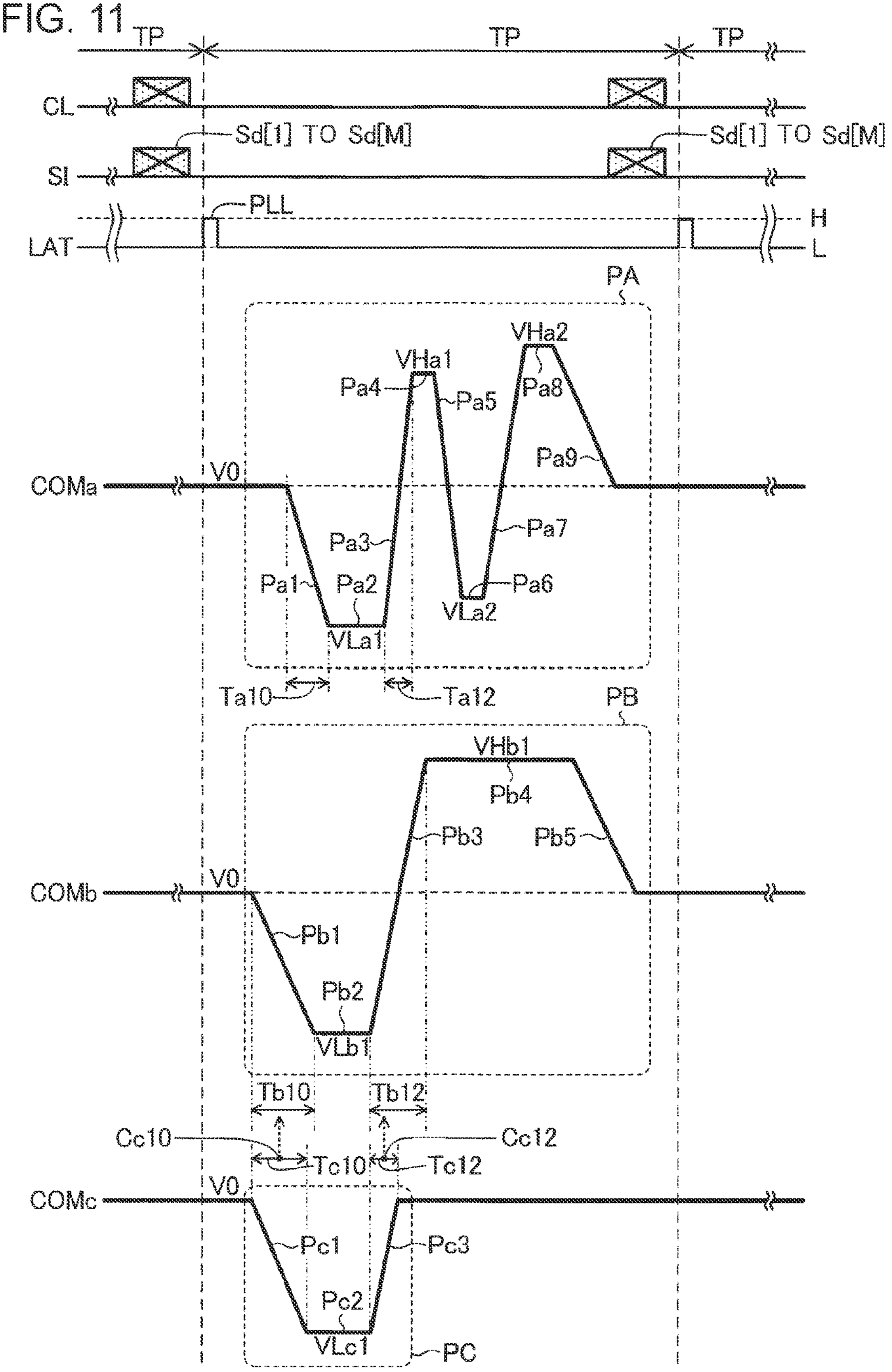
FIG. 11 illustrates timing charts for explaining an example of drive signals in a first modification.

FIG. 11 illustrates timing charts for explaining an example of drive signal COM in a first modification. The same elements as those described in FIG. 1 to FIG. 10 are labeled with the same symbol, and a detailed description is omitted.

In the example illustrated in FIG. 11, a plurality of drive signals COM has the drive signals COMa and COMb described in FIG. 6 and other figures, and the drive signal COMc. The drive signal COMc is an example of a "third drive signal".

The drive signal COMc has a waveform PC. For example, the drive signal COMc has the pulse of the waveform PC provided in the unit time period TP. The waveform PC is a waveform in which the electrical potential of the drive signal COMc starts from the reference potential V0, changes through electrical potential VLc1 lower than the reference potential V0, and returns to the reference potential V0. The waveform PC is an example of a "third waveform".

In the following, of the waveform PC, the portion in which the electrical potential of the drive signal COMc changes from the reference potential V0 to the electrical potential VLc1 is also referred to as waveform Pc1, and the portion in which the electrical potential of the drive signal COMc is maintained at the electrical potential VLc1 is also referred to as waveform Pc2. In addition, of the waveform PC, the portion in which the electrical potential of the drive signal COMc changes from the electrical potential VLc1 to the reference potential V0 is also referred to as waveform Pc3. In short, the waveform PC includes the waveforms Pc1, Pc2 and Pc3.

The waveforms Pc1 is a waveform to displace the piezoelectric element PZ in +Z direction. Specifically, the waveforms Pc1 is a waveform in which the electrical potential of the drive signal COMc changes to cause the volume of the cavity CV to expand. Therefore, of the plurality of elements that form the pulse of the waveform PC, the waveform Pc1 corresponds to an expansion element that changes the electrical potential of the drive signal COMc to drive the piezoelectric element PZ so as to expand the volume of the cavity CV.

The waveform Pc3 is a waveform to displace the piezoelectric element PZ in −Z direction. Specifically, the waveforms Pc3 is a waveform in which the electrical potential of the drive signal COMc changes to cause the volume of the cavity CV to contract. Therefore, of the plurality of elements that form the pulse of the waveform PC, the waveforms Pc3 corresponds to a contraction element that changes the electrical potential of the drive signal COMc to drive the piezoelectric element PZ so as to contract the volume of the cavity CV. In this modification, when driven by the electrical potential change of the waveforms Pc3, the piezoelectric element PZ stirs the ink in the nozzle N without contracting the volume of the cavity CV and discharging the ink through the nozzle N. Note that the waveform Pc3 is an example of a "third contraction waveform".

The waveform Pc2 is a waveform to maintain the position of the piezoelectric element PZ in the Z direction. Of the plurality of elements that form the pulse of the waveform PC, for example, the waveforms Pc2 corresponds to an expansion maintenance element that maintains the electrical potential of the drive signal COMc to drive the piezoelectric element PZ so as to maintain the volume of the cavity CV expanded by the waveform Pc1.

The waveform PC is determined so that when an individual drive signal Vin[m] having the waveform PC is supplied to the discharger D[m], the piezoelectric element PZ stirs the liquid in the nozzle N without discharging the ink through the nozzle N.

In the unit time period TP, center Cc12 of time period Tc12 of the waveform Pc3 of the drive signal COMc is located within at least one of the time period Ta12 of the waveform Pa3 of the drive signal COMa and the time period Tb12 of the waveform Pb3 of the drive signal COMb. Thus, in this modification, it is possible to reduce the effect of the electrical potential change of the bias voltage signal VBS by the waveform Pc3 on the characteristics of discharge of ink when the dischargers D discharge ink by the drive signal COMa or COMb.

As in the example illustrated in FIG. 11, the center Cc12 may be located within both the time periods Ta12 and Tb12.

In this modification, the first timing that is the center Cb12 of the time period Tb12 of the waveform Pb3, the second timing that is the center Ca12 of the time period Ta12 of the waveform Pa3, and a third timing that is the center Cc12 of the time period Tc12 of the waveform Pc3 may match. Even in this situation, change in the characteristics of discharge of ink by the dischargers D can be prevented.

In the example illustrated in FIG. 11, center Cc10 of time period Tc10 of the waveform Pc1 of the drive signal COMc is located within the time period Tb10 of the waveform Pb1 of the drive signal COMb in the unit time period TP. Even in this situation, when dots including large dots DL are discharged from part of the M dischargers D, and the ink in the nozzle N is stirred without discharging the ink from the rest of the part in the unit time period TP, change in the bias voltage signal VBS before the waveform Pb1 of the drive signal COMb can be prevented at the timing at which no electrical potential change of the bias voltage signal VBS is made originally when the ink droplets discharged from the M dischargers D are all large dots DL in the unit time period TP, thus change in the characteristics of discharge of ink by the dischargers D can be prevented. In the example illustrated in FIG. 11, the center Cc10 is located within the time period Tb10 of the waveform Pb1 of the drive signal COMb, but is located before the time period Ta10 of the waveform Pa1 of the drive signal COMa. However, the central Cc10 may be located within both the time periods Ta10 and Tb10.

In this modification, one of the drive signals COMa and COMb may be omitted. In this situation, the drive signal COMc is another example of the "second drive signal". For example, the plurality of drive signals COM may have the drive signals COMb and COMc, or the drive signals COMa and COMc. When the drive signal COMa is omitted, and the plurality of drive signals COM have the drive signals COMb and COMc, the drive signal COMb corresponds to the "first drive signal", and the drive signal COMc corresponds to the "second drive signal". Alternatively, when the drive signal COMb is omitted, and the plurality of drive signals COM have the drive signals COMa and COMc, the drive signal COMa corresponds to the "first drive signal", and the drive signal COMc corresponds to the "second drive signal".

Also, in this modification described above, the same effect as in the above-described embodiment can be obtained. In addition, in this modification, the plurality of drive signals COM further include the drive signal COMc having the waveform PC different from the waveforms PA and PB. The waveform PC includes the waveform Pc3 in which the electrical potential of the drive signal COMc changes to cause the volume of the cavity CV to contract. In the unit time period TP, the center Cc12 of the time period Tc12 of the waveform Pc3 of the drive signal COMc is located within at least one of the time period Ta12 of the waveform Pa3 of the drive signal COMa and the time period Tb12 of the waveform Pb3 of the drive signal COMb. When driven by the electrical potential change of the waveforms Pc3, the piezoelectric element PZ stirs the ink in the nozzle N without contracting the volume of the cavity CV and discharging the ink through the nozzle N. In this modification, increase in the viscosity of ink can be prevented by supplying the drive signal COMc to the dischargers D.

In this modification, one of the drive signals COMa and COMb may be omitted. For example, in the embodiment described above, the plurality of drive signals COM may have the drive signal COMc instead of the drive signal COMa. In this situation, when driven by the electrical potential change of the waveform Pb3, the piezoelectric element PZ contracts the volume of the cavity CV and discharges ink through the nozzle N. When driven by the electrical potential change of the waveform Pc3, the piezoelectric element PZ stirs the ink in the nozzle N without contracting the volume of the cavity CV and discharging the ink through the nozzle N. Even when the plurality of drive signals COM have the drive signal COMc instead of the drive signal COMa, the same effect as in the above-described embodiment can be obtained.

Second Modification

In the embodiment described above, an example has been shown in which the first timing that is the center Cb12 of the time period Tb12 of the waveform Pb3 matches the second timing that is the center Ca12 of the time period Ta12 of the waveform Pa3; however, the present disclosure is not limited to this aspect. For example, in the unit time period TP, the timing of the highest value of current which flows through line Li according to the electrical potential change of the waveform Pb3 may match the timing of the highest value of current which flows through line Li according to the electrical potential change of the waveform Pa3.

Figure 12:
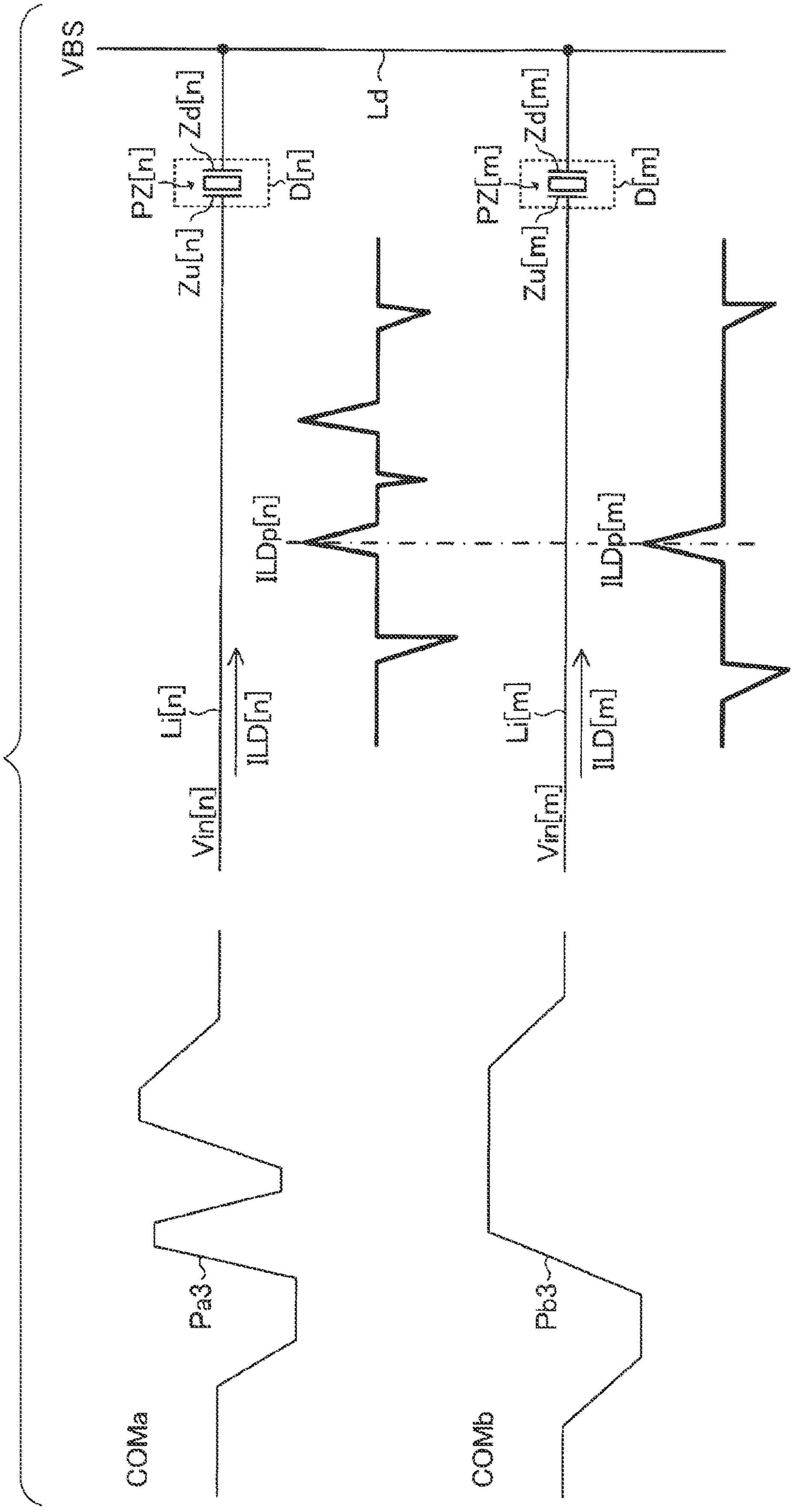
FIG. 12 illustrates explanatory charts for explaining a timing relationship between drive signals in a second modification.

FIG. 12 illustrates explanatory charts for explaining a timing relationship between the drive signals COMa and COMb in a second modification. The same elements as those described in FIG. 1 to FIG. 11 are labeled with the same symbol, and a detailed description is omitted.

In this modification, it is assumed that the individual drive signal Vin[m] supplied to the discharger D[m] includes the waveform Pb3, and the individual drive signal Vin[n] supplied to the discharger D[n] includes the waveform Pa3. In this situation, one of the dischargers D[m] and D[n] is an example of a "first discharger", and the other of the dischargers D[m] and D[n] is an example of a "second discharger". In addition, one of the lines Li[m] and Li[n] is an example of a "first line", and the other of the lines Li[m] and Li[n] is an example of a "second line". For example, when the discharger D[m] corresponds to the "first discharger", the line Li[m] corresponds to the "first line".

Through the line Li[m] that supplies the individual drive signal Vin[m] to the discharger D[m], current ILD[m] flows according to the electrical potential change of the individual drive signal Vin[m]. For example, the waveform of the current ILD[m] which flows through the line Li[m] according to the electrical potential change of the waveform Pb3 has peak ILDp[m]. In addition, through the line Li[n] that supplies the individual drive signal Vin[n] to the discharger D[n], current ILD[n] flows according to the electrical potential change of the individual drive signal Vin[n]. For example, the waveform of the current ILD[n] which flows through the line Li[n] according to the electrical potential change of the waveform Pa3 has peak ILDp[n].

In this modification, the drive signals COMa and COMb are determined so that the timing of the peak ILDp[m] of the current ILD[m] matches the timing of the peak ILDp[n] of the current ILD[n] in the unit time period TP. In other words, in this modification, the timing of the highest value of the current ILD[m] which flows through the line Li[m] according to the electrical potential change of the waveform Pb3 matches the timing of the highest value of the current ILD[n] which flows through the line Li[n] according to the electrical potential change of the waveform Pa3. In this situation, the peak of the electrical potential change of the bias voltage signal VBS by the current ILD[m] matches or is close to the peak of the electrical potential change of the bias voltage signal VBS by the current ILD[n]. Therefore, also in this modification, change in the electrical potential of the bias voltage signal VBS can be prevented at the timing at which no change in electrical potential is made originally, thus change in the characteristics of discharge of ink by the dischargers D can be prevented.

Also, in this modification described above, the same effect as in the above-described embodiment can be obtained. For example, in this modification, the ink jet printer 1 has the line Li[m] that supplies the individual drive signal Vin[m] to the discharger D[m] among the plurality of dischargers D, and the line Li[n] that supplies the individual drive signal Vin[n] to the discharger D[n] among the plurality of dischargers D. When an individual drive signal Vin[m] supplied to the discharger D[m] includes the waveform Pb3, and an individual drive signal Vin[n] supplied to the discharger D[n] includes the waveform Pa3, the timing of the highest value of the current ILD[m] which flows through the line Li[m] according to the electrical potential change of the waveform Pb3 matches the timing of the highest value of current ILD[n] which flows through the line Li[n] according to the electrical potential change of the waveform Pa3 in the unit time period TP. Thus, also in this modification, change in the electrical potential of the bias voltage signal VBS can be prevented at the timing at which no change in electrical potential is made originally. As a result, also in this modification, change in the characteristics of discharge of ink by the dischargers D can be prevented.

Third Modification

In the embodiment and modifications described above, examples have been shown in which the piezoelectric element PZ is displaced in −Z direction due to a change of the electrical potential of the individual drive signal Vin[m] from a low electrical potential to a high electrical potential; however, the present disclosure is not limited to this aspect. For example, a piezoelectric element PZ may be used, which is displaced in −Z direction due to a change of the electrical potential of the individual drive signal Vin[m] from a high electrical potential to a low electrical potential. In this situation, for example, the electrical potential of the drive signal COM changes from a low electrical potential to a high electrical potential in a portion corresponding to an expansion element, and changes from a high electrical potential to a low electrical potential in a portion corresponding to a contraction element. Also, in this modification, the same effect as in the above-described embodiment and modifications can be obtained.

Fourth Modification

In the embodiment and modifications described above, examples have been shown in which each head unit 3 has one nozzle array NL; however, the present disclosure is not limited to this aspect. For example, each head unit 3 may have a plurality of nozzle arrays NL. Also, in this modification, the same effect as in the above-described embodiment and modifications can be obtained.

Fifth Modification

In the embodiment and modifications described above, examples have been shown in which the ink jet printer 1 has four head units 3; however, the present disclosure is not limited to this aspect. For example, the ink jet printer 1 may have one or more and three or less head units 3, or have five or more head units 3.

Sixth Modification

In the embodiment and modifications described above, examples have been shown in which the ink jet printer 1 is a serial printer; however, the present disclosure is not limited to this aspect. For example, the ink jet printer 1 may be a so-called line printer in which the head unit 3 is provided with a plurality of nozzles N which extend wider than the width of the recording sheet P. Also, in this modification, the same effect as in the above-described embodiment and modifications can be obtained.

What is claimed is:

1. A liquid discharge apparatus comprising:

a plurality of dischargers including a nozzle to discharge liquid, a pressure chamber communicating with the nozzle, and a drive element to discharge liquid in the pressure chamber through the nozzle; and a driver that is configured to generate, for each of the plurality of dischargers, an individual drive signal to drive the drive element included in the discharger based on a plurality of drive signals including a first drive signal having a first waveform, and a second drive signal having a second waveform different from the first waveform, wherein the first waveform includes a first contraction waveform in which an electrical potential of the first drive signal changes to cause a volume of the pressure chamber to contract, and the second waveform includes a second contraction waveform in which an electrical potential of the second drive signal changes to cause the volume of the pressure chamber to contract, and in one cycle of the plurality of drive signals, a center of one of a time period of the first contraction waveform of the first drive signal and a time period of the second contraction waveform of the second drive signal is located in the other of the time periods.

2. The liquid discharge apparatus according to claim 1, further comprising:

a first line that is configured to supply the individual drive signal to a first discharger of the plurality of dischargers; and a second line that is configured to supply the individual drive signal to a second discharger of the plurality of dischargers, wherein when the individual drive signal supplied to the first discharger includes the first contraction waveform, and the individual drive signal supplied to the second discharger includes the second contraction waveform, in the one cycle, a timing of a highest value of current which flows through the first line according to an electrical potential change of the first contraction waveform matches a timing of a highest value of current which flows through the second line according to an electrical potential change of the second contraction waveform.

3. The liquid discharge apparatus according to claim 1, further comprising:

a first bias electrode which is provided in a first discharger of the plurality of dischargers, and to which a bias voltage signal is supplied;

a second bias electrode which is provided in a second discharger of the plurality of dischargers, and to which the bias voltage signal is supplied; and a line that is configured to supply the bias voltage signal to the first bias electrode and the second bias electrode, wherein when the individual drive signal supplied to the first discharger includes the first contraction waveform, and the individual drive signal supplied to the second discharger includes the second contraction waveform, in the one cycle, a timing of a highest value of fluctuation of an electrical potential of the first bias electrode in the time period of the first contraction waveform matches a timing of a highest value of fluctuation of an electrical potential of the second bias electrode in the time period of the second contraction waveform.

4. The liquid discharge apparatus according to claim 1, wherein in the one cycle, a difference between a first timing that is a center of the time period of the first contraction waveform of the first drive signal and a second timing that is a center of the time period of the second contraction waveform of the second drive signal is less than or equal to ±15% of the time period of the first contraction waveform.

5. The liquid discharge apparatus according to claim 4, wherein in the one cycle, the first timing matches the second timing.

6. The liquid discharge apparatus according to claim 1, wherein the first waveform further includes a first expansion waveform in which an electrical potential of the first drive signal changes to cause the volume of the pressure chamber to expand, the second waveform further includes a second expansion waveform in which an electrical potential of the second drive signal changes to cause the volume of the pressure chamber to expand, the first contraction waveform occurs after a time period of the first expansion waveform, the volume of the pressure chamber expanded by an electrical potential change of the first expansion waveform is contracted by an electrical potential change of the first contraction waveform, the second contraction waveform occurs after a time period of the second expansion waveform, the volume of the pressure chamber expanded by an electrical potential change of the second expansion waveform is contracted by an electrical potential change of the second contraction waveform, and in the one cycle, a center of one of the time period of the first expansion waveform of the first drive signal and the time period of the second expansion waveform of the second drive signal is located in the other of the time periods.

7. The liquid discharge apparatus according to claim 1, wherein when the drive element is driven by an electrical potential change of the first contraction waveform, the volume of the pressure chamber contracts so that liquid discharges through the nozzle, and when the drive element is driven by an electrical potential change of the second contraction waveform, the volume of the pressure chamber contracts so that the liquid in the nozzle stirs without the liquid discharges through the nozzle.

8. The liquid discharge apparatus according to claim 1, wherein when the drive element is driven by an electrical potential change of the first contraction waveform, the volume of the pressure chamber contracts so that a first amount of liquid discharges through the nozzle, and when the drive element is driven by an electrical potential change of the second contraction waveform, the volume of the pressure chamber contracts so that a second amount of liquid discharges through the nozzle.

9. The liquid discharge apparatus according to claim 8, wherein the plurality of drive signals include a third drive signal having a third waveform different from the first waveform and the second waveform, the third waveform includes a third contraction waveform in which an electrical potential of the third drive signal changes to cause the volume of the pressure chamber to contract, in the one cycle, a center of a time period of the third contraction waveform of the third drive signal is located in at least one of the time period of the first contraction waveform of the first drive signal and the time period of the second contraction waveform of the second drive signal, and when the drive element is driven by an electrical potential change of the third contraction waveform, the volume of the pressure chamber contracts so that the liquid in the nozzle stirs without the liquid discharges through the nozzle.

10. A method of controlling a liquid discharge apparatus including a plurality of dischargers including a nozzle to discharge liquid, a pressure chamber communicating with the nozzle, and a drive element to discharge liquid in the pressure chamber through the nozzle, the method comprising generating, for each of the plurality of dischargers, an individual drive signal to drive the drive element included in the discharger based on a plurality of drive signals including a first drive signal having a first waveform, and a second drive signal having a second waveform different from the first waveform, wherein the first waveform includes a first contraction waveform in which an electrical potential of the first drive signal changes to cause a volume of the pressure chamber to contract, and the second waveform includes a second contraction waveform in which an electrical potential of the second drive signal changes to cause the volume of the pressure chamber to contract, and in one cycle of the plurality of drive signals, a center of one of a time period of the first contraction waveform of the first drive signal and a time period of the second contraction waveform of the second drive signal is located in the other of the time periods.

* * * * *